United States Patent [19]
Commerford et al.

[11] Patent Number: 6,137,774
[45] Date of Patent: Oct. 24, 2000

[54] SYSTEM AND METHOD FOR DISPATCHING COMMANDS TO SWITCHING ELEMENTS WITHIN A COMMUNICATIONS NETWORK

[75] Inventors: Gerard L. Commerford; Barbara A. Pauls, both of Colorado Springs, Colo.

[73] Assignee: MCI Communications Corporation, Washington, D.C.

[21] Appl. No.: 08/903,611

[22] Filed: Jul. 31, 1997

[51] Int. Cl.$^7$ .................................................. H04J 1/16
[52] U.S. Cl. .................................. 370/216; 714/4; 714/5; 714/10
[58] Field of Search ................................... 370/217, 218, 370/219, 220, 241, 242, 244, 250, 216; 395/180, 181, 182.01, 182.02; 714/4, 5, 10

[56] References Cited

U.S. PATENT DOCUMENTS

| | | | |
|---|---|---|---|
| 3,678,205 | 7/1972 | Cohen et al. | 370/382 |
| 4,213,201 | 7/1980 | Gagnier et al. | 370/220 |
| 4,300,230 | 11/1981 | Phillip et al. | 370/244 |
| 4,402,074 | 8/1983 | Cupuis et al. | 370/250 |
| 4,611,320 | 9/1986 | Southard | 370/241 |
| 4,737,951 | 4/1988 | Kruger et al. | 370/217 |
| 5,127,004 | 6/1992 | Lenihan et al. | 370/525 |
| 5,398,236 | 3/1995 | Hemmady et al. | 370/218 |
| 5,621,729 | 4/1997 | Johnson et al. | 370/259 |

*Primary Examiner*—Ajit Patel
*Assistant Examiner*—Bob A. Phunkulh

[57] ABSTRACT

A system and method for dispatching commands to switching elements within a network in response to an outage comprising a control computer and a plurality of instructions resident on a memory device for operating the control computer, the plurality of instructions including a code segment for receiving and organizing connect and disconnect commands for the switching elements, a code segment for sending connect and disconnect commands to the switching elements, and a code segment for analyzing responses from the switching elements to determine whether communications are restored are disclosed.

4 Claims, 19 Drawing Sheets

![6,137,774]

SYSTEM AND METHOD FOR DISPATCHING COMMANDS TO SWITCHING ELEMENTS WITHIN A COMMUNICATIONS NETWORK

TECHNICAL FIELD OF THE INVENTION

This invention relates, in general, to the restoration of network information systems, and in particular to, a system and method for dispatching commands to switching elements within a communications network to restore communication within a network following an outage.

BACKGROUND OF THE INVENTION

Without limiting the scope of the present invention, the background is described in connection with telecommunication networks.

Telecommunication networks serve a vital role in both the public and private sectors. For example, businesses and individuals rely on these sophisticated networks to transport information, both voice and data, from one location to another. Of particular importance to both businesses and individuals is the reliability and cost of communicating via the telecommunications infrastructure. For example, if an outage occurs within a telecommunication network, vast amounts of information may be lost coupled with the substantial costs associated therewith.

Network outages develop when a discontinuity occurs within the network architecture. A discontinuity within the network may result for reasons such as, a natural disaster, accidental or intentional human intervention, or faulty network components. Regardless of the cause of the network outage, however, the communication within the network must be restored as promptly as possible to avoid unnecessary and costly disruptions in communication.

Presently, restoration of communications service is implemented by selecting alternate routes within the network which are not effected by the outage. Typically, a restoration pre-plan is used. These pre-plans are developed from network topology information which is periodically gathered and stored. It has been found, however, that due to the rapid and continuous nature of changes to the architecture of networks, the data used to prepare the pre-plans and therefore the pre-plans themselves may be obsolete before they are implemented. When a pre-plan is unsuccessful, an audit of the network architecture is required to develop a new restoration plan. This ad-hoc approach to restoration of communications, however, has been found to take an unacceptably long period of time.

Therefore, a need has arisen for a reliable, efficient and cost effective method for restoring communication after a network outage occurs. A need has also arisen for a method of maintaining real-time information regarding network architecture. Further, a need has arisen for a system and method for dispatching commands to switching elements within a communications network to restore communication within the network following an outage.

SUMMARY OF THE INVENTION

The present invention disclosed herein comprises a system and method that reliably, efficiently and cost effectively restores communication within a network after a network outage has occurred. The system and method of the present invention also dispatches commands to switching elements within a communications network to restore communication within the network following an outage.

The system and method of the present invention comprises a control computer and a plurality of instructions resident on a memory device for operating the control computer. The plurality of instructions includes a code segment for receiving and organizing connect and disconnect commands for the switching elements which includes grouping the connect and disconnect commands for each of the switching elements. The connect and disconnect commands for the switching elements may be dynamically generated or may be received from a pre-plan database.

The plurality of instructions also includes a code segment for sending connect and disconnect commands to the switching elements. The plurality of instructions further includes a code segment for analyzing responses from the switching elements to determine whether communications are restored including limiting the time period for the responses from the switching elements. If it is determined that communications are not restored, the system and method of the present invention normalizes the network to its prior configuration.

In addition, the plurality of instructions includes a code segment for normalizing the network after the cause of an outage is corrected. This normalization process may occur without disrupting communications within the network.

BRIEF DESCRIPTION OF THE DRAWINGS

For a more complete understanding of the present invention, including its features and advantages, reference is now made to the detailed description of the invention, taken in conjunction with the accompanying drawings in which like numerals identify like parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
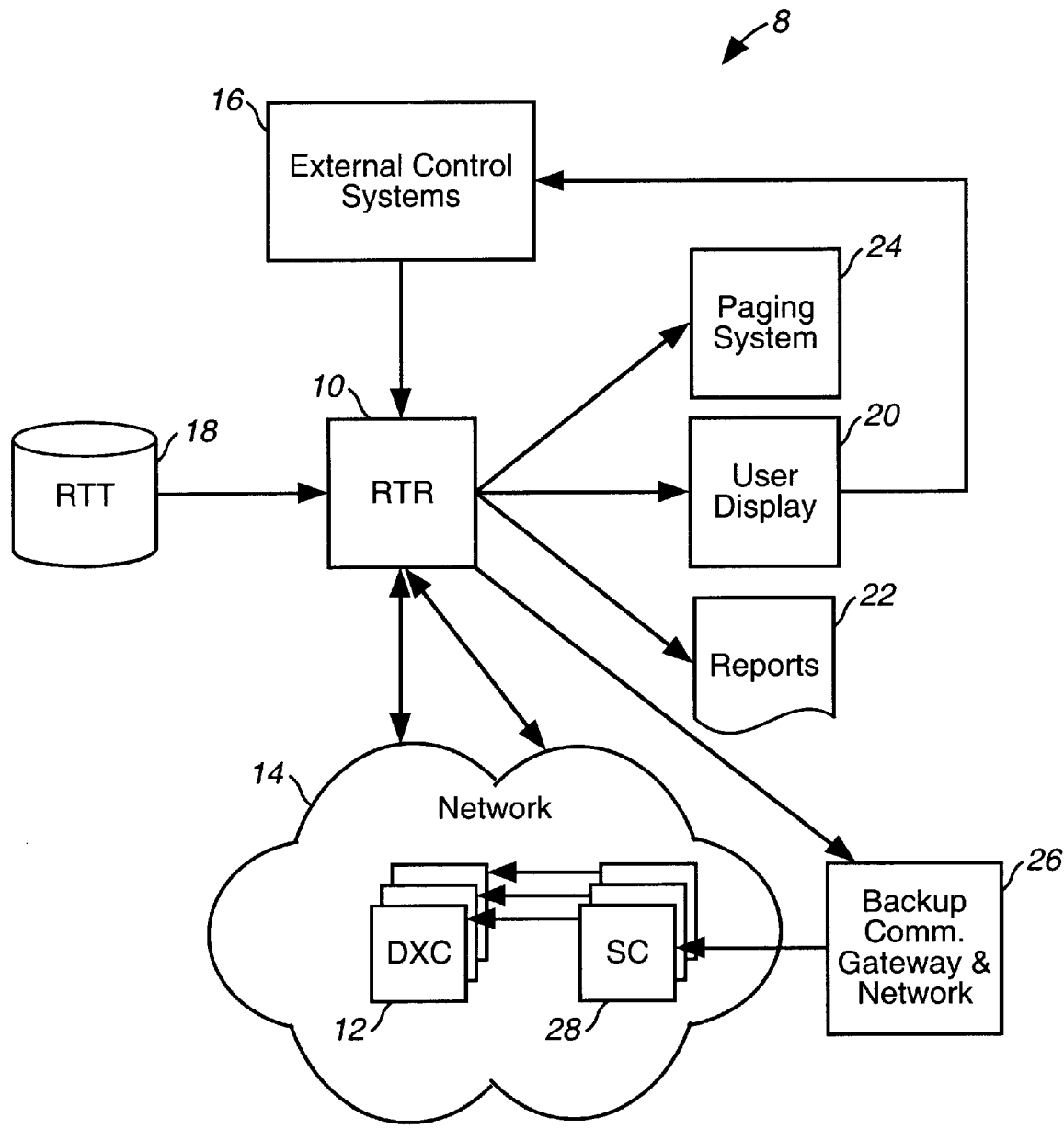
FIG. 1 is an architectural diagram depicting a network restoration system of the present invention.

Referring now to FIG. 1, a high level network restoration architectural diagram illustrating the use of the present invention is shown and denoted generally as 8. Real time restoration (RTR) 10 is a software application that may be implemented on a high-performance midrange computer, such as, but not limited to, a DEC Alpha running with a Open VMS or VMS operating system. Alternatively, RTR 10 may be implemented on other types of computers or on multiple computers in a distributed architecture. It is also desirable to have two or more redundant, remotely located RTR 10 systems, one running as primary and the others as backup, for survivability purposes. RTR 10 is designed to accommodate this functionality with automated execution state designations, as will be described later.

The restoration network 8 may be implemented within a telecommunications network 14 with a plurality of network switching elements, such as a Digital Cross-Connect (DXC) 12. DXC 12 may be used to reroute information carrying lines in the event of an outage. Switching is performed based on commands generated and provided by RTR 10.

Network 14, which may be a protocol specific network, is used to transmit RTR 10 commands to each DXC 12. The network 14 is also used to transmit command responses and alarms, generated by the DXC 12, to RTR 10. Other means for communications through the network 14 between the RTR 10 and the DXC 12 may be used.

RTR 10 has an interface with one or more external control systems 16. These external control systems 16 represent any system or collection of systems that are used to create, store, and upload restoration pre-plans; provide a means for user input, such as selection of restoration mode (dynamic or pre-plan) and selection of pre-plans; and provide a means for user display of data. For example, user input to the RTR 10 may be achieved through a personal computer (PC) or workstation (WS). Other automated input, such as restoration pre-plans, may be through another computer, such as an IBM mainframe.

It is possible to realize external control systems 16 on the same computer as RTR 10. The RTR 10 may interface with external control systems 16 on the same computer as RTR 10 via messaging to and from internal VMS mailboxes. Alternatively, the RTR 10 may interface with external control systems 16 on other computers, by way of DECNet messaging, when RTR 10 is implemented on a DEC Alpha computer.

RTR 10 also receives input from a real-time topology (RTT) database 18. RTT 18 contains data on the topology of network 14 including all components and trunks of network 14. This data is updated in real-time, so as to reflect the most current state of the network 14. RTR 10 is only interested in topology data as it pertains to a physical restoration network 14. Therefore, some processing is required within RTR 10 to extract and properly represent the data that is relevant to restoration. This will generally include data on DXC 12 devices and their inter connectivity.

Since RTT 18 contains data on all network 14 topology, it is typically stored and maintained external to RTR 10, as it has many purposes and uses independent of RTR 10. RTR 10 is designed to use data from RTT 18, for convenience of use, and to keep an internal store of select data relevant to restoration. This internal store of restoration data will be described later, in reference to FIG. 3 and FIG. 5.

RTR 10 is designed with a means for presenting results of restoration, and other data, to the user via a user display 20. This user display 20, which may be a graphical user interface (GUI), can be on the same computer as the external control system 16 for user input, which is generally a PC. This is conducive for purposes such as providing the user with a list of restoration options, then accepting the user's selection of an option.

Thus, while FIG. 1 shows the logical breakdown of components based on functionality, many functions, such as user display 20 and user input 16, may be realized on the same computer. Typically, other external control systems 16, such as development and maintenance of pre-plans, are realized on a different computer for performance reasons. However, it is possible to realize all external control systems 16 on a single computer.

RTR 10 is also designed with a means for producing reports 22. These reports 22 detail the results of restoration, error messages, other system messages, and other data desired by the user. Reports 22 may be customized to the user's needs. RTR 10 provides the means and data for generating such reports 22.

RTR 10 is also designed with a means for issuing a page to a developer if certain error messages are produced within RTR 10. An interface to a paging system 24 provides the means for delivering the page.

RTR 10 may also include a backup communications system with the DXCs 12. While network 14 provides primary communications through a pair of redundant binary data links to each DXC 12, a backup communications gateway and network 26 may be used to communicate with each DXC 12 in the event that primary communications fail. The backup communications gateway and network 26 provides data links to each DXC 12 by way of a site controller (SC) 28, one of which is located at each DXC 12 site. When RTR 10 detects failure in the primary communications, RTR 10 automatically shifts to the backup communications to reach the DXCs 12.

Using the architecture shown in FIG. 1, RTR 10 can support both a pre-plan and a dynamic restoration methodology on a common system platform. For a pre-plan methodology, pre-plans are developed on an external control system 16, such as an IBM mainframe. Pre-plans are then downloaded to another external control system 16, such as a PC.

When RTR 10 detects a network outage, it notifies the user through the user display 20 which may be a PC. The user may then select to utilize a pre-plan, or utilize dynamic restoration. If the user selects a pre-plan, the PC uploads that pre-plan to RTR 10, which proceeds to implement it. To implement a pre-plan, RTR 10 reads the actions from the pre-plan, which are stored in a generic format in a file, translates these actions to actual DXC 12 commands, and issues these commands to the DXC 12. Results of the pre-plan implementation are then provided to the user display 20. If the user selects dynamic restoration, RTR 10 proceeds to generate a restoral route dynamically. RTR 10 then implements that restoral route by issuing commands to the DXC 12 devices, and notifies the user of results.

Figure 2:
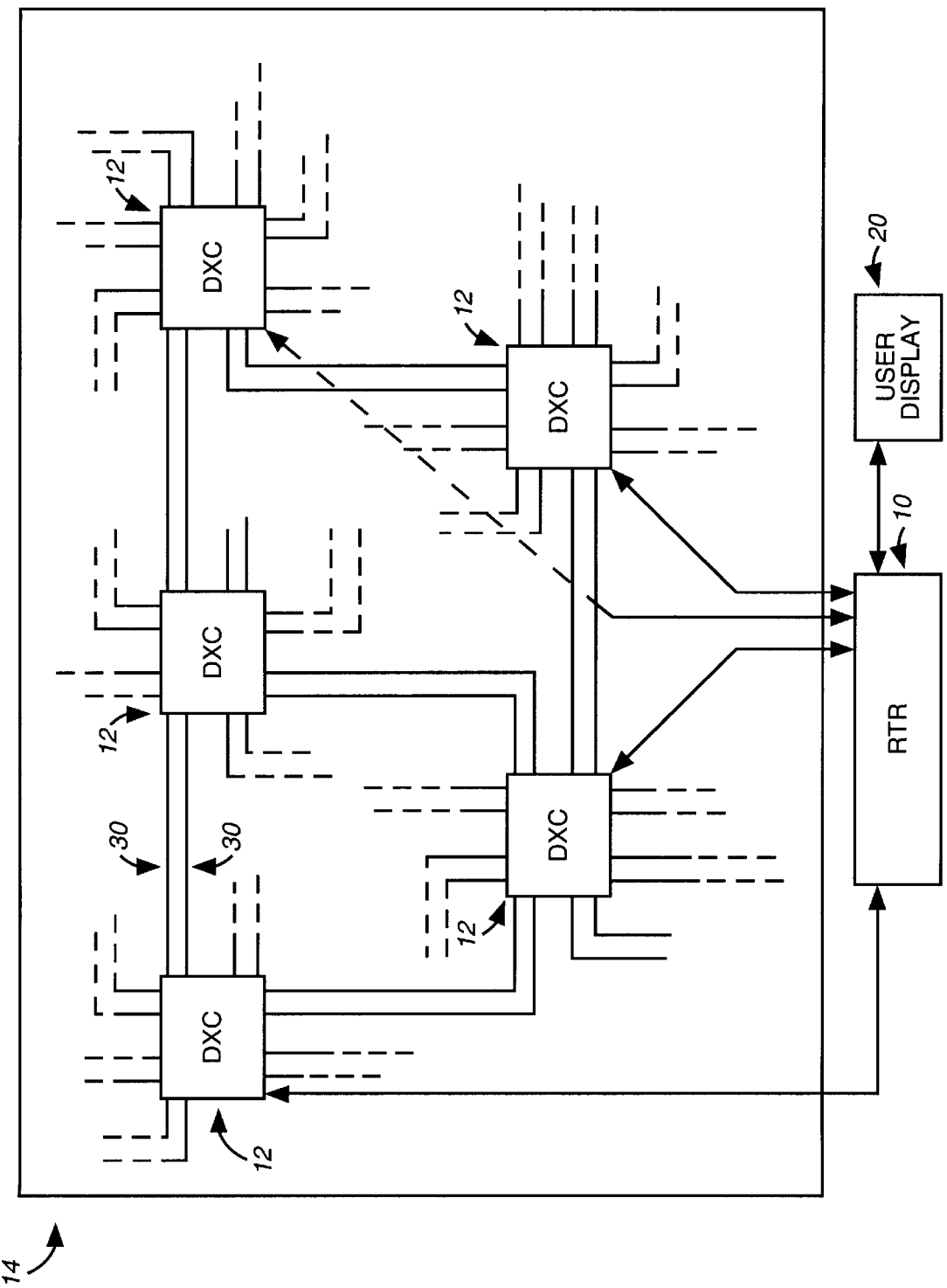
FIG. 2 is a schematic illustration of a typical network architecture.

Referring now to FIG. 2, a high level depiction of a network architecture consisting of network elements 12 is depicted and denoted generally as 14. Network 14 consists of a plurality of network elements, such as DXCs 12. The DXCs 12 within FIG. 2 can be bi-directional switching elements that are used to route information to a predetermined destination. For example, digital data, such as information distributed to and from LAN or WAN, digital voice data, such as telephone communication, and digital images, such as video conferencing. The DXCs 12 within a network 14 are memory resident within a logical topology, i.e., information concerning the configuration of each device is resident within memory of the RTR 18 database. The RTR 10 in FIG. 2, with the aid of the RTR 18 logical topology, is capable of determining the most efficient and cost effective route for restoration of service to the customer. The RTR 10 is only concerned with the RTR 18 topology that is available for restoration of traffic.

Information travels between two DXC 12 on trunk segments 30. Data flows in either direction down each trunk segment 30 with a predetermined destination. The DXCs 12 are capable of re-routing network data based on instructions from the RTR 10 and information associated with data that travel through the network 14. The destination routes for data are determined based on information regarding data type and destination.

Network communication problems usually occur when a disruption occurs within trunk segment 30. For example, segment 30 of network 14 could be disrupted due to a natural disaster, such as lightning striking a control center or from accidents cause by operating heavy equipment around trunk segment 30 which tears through trunk segment 30. Once service has been disrupted, DXCs 12 associated with the trunk segments 30 that are effected will be isolated and a restoration route is initiated by a pre-plan restoration route or by dynamically generating a restorable route with the RTR 10 in the most efficient and cost effective manner.

An alarm is generated by DXCs 12 when, among other things, a discontinuity or outage occurs within a trunk segment 30. The RTR 10 determines the validity of the alarm and the DXCs 12 generating the alarm to isolate the effected segments 30 and identify alternate routes to restore service. Factors effecting restoration lie within the boundaries of availability and costs.

Figure 3:
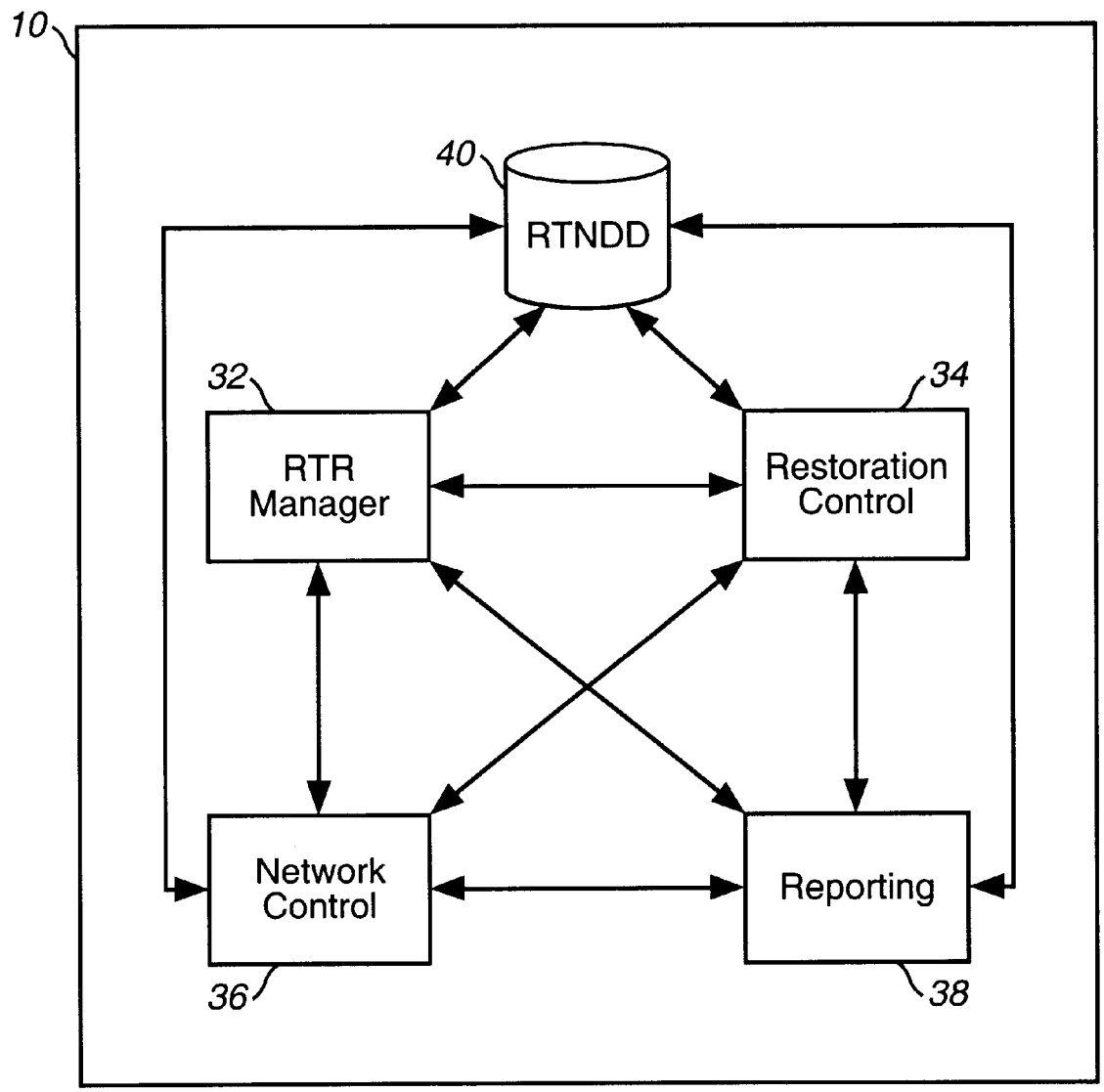
FIG. 3 is a block diagram illustrating an internal architecture of a network restoration system of the present invention.

FIG. 3 is a block diagram illustrating the high-level internal architecture of RTR 10. RTR 10 is comprised of four main process components which are an RTR manager 32, a restoration control 34, a network control 36, and a reporting component 38. Each of these components represent a collection of software processes. In addition, certain data elements are used by these components. Each component, consisting of several distinct processes and data elements, are shown in detail and described in reference to FIGS. 3–6.

Process components in RTR 10 can communicate with each other through messages that are passed among internal VMS mailboxes. Each process, several of which make up each high-level component shown in FIG. 3, has its own identifiable mailbox address. Using these mailbox addresses, each process can communicate with any other process by sending a properly addressed message. To aid in the convenience of inter-process communications, each high-level component shown in FIG. 3 has a process coordinator component that is responsible for, among other things, distributing messages to other processes within the same high-level component.

In addition to individual data elements used by each process component, the RTNDD 40, a centralized database containing restoration network device data is used. The RTNDD 40 contains data that reflects each restoration device, such as each DXC 12. It is organized such that each DXC 12 has its own partition within RTNDD 40, and within each DXC 12 partition are individual data elements for each DXC 12 port.

The RTNDD 40 is updated in real-time by the RTR manager 32 with the most current data reflecting the DXC 12 network. It is used by many different process components within RTR 10, as will be described in reference to FIGS. 5–8.

The RTR manager 32 provides a single interface to external control systems 16. This includes all external control systems 16, the RTT 18, and the user display 20. The only exception are the DXCs 12 via the network 14 and the backup communications network 26 which interface directly with network control 36.

RTR Manager 32 also provides centralized control of the RTR 10 system. It receives commands from the external control systems 16, and distributes the commands to internal processes. It also ensure responses are returned when needed. RTR manager 32 is responsible for receiving data from RTT 18, and updating and maintaining data in the RTNDD 40. The RTR manager 32 is described and shown in detail in FIG. 5.

Restoration control 34 is responsible for performing the algorithms for actual network restoration, including route generation for dynamic restoration. Using topology data from the RTNDD 40, restoration control 34 analyzes alarms received from the DXCs 12 and isolates the location of an outage. Restoration control then generates restoration routes for each impacted trunk 30, and sends commands needed to implement restoration routes to network control 36. Restoration control 34 is described and shown in detail in FIG. 6.

Network control 36 provides the interface to the DXC 12 Network. Network control 36 receives commands for DXCs 12 in a generic format from restoration control 34. Network control 36 may also receive commands from external control systems 16 through the RTR manager 32. Network control 36 then translates commands in this generic format to device-specific formats, and issues these commands to the appropriate DXCs 12. Network control 36 also receives responses and unsolicited alarms from DXCs 12, and distributes these to appropriate processes within RTR 10. Network control 36 manages the communications with the DXCs 12 using binary data links over the network 14, as well as backup communications 26. Network control 36 is described and shown in detail in FIG. 7.

Reporting 38 is responsible for generating all reports 22, issuing pages to a paging system 24, and providing data to the user display 20. Reporting 38 is described and shown in detail in FIG. 6.

There may be more than one instance of RTR 10, each instance running on a separate computer at a different physical location. This is for survivability of the RTR 10 system. However, only one instance of RTR 10 can have control over the restoration process, including communications with DXCs 12, at any one time. Therefore, each instance of RTR 10 runs in one of two execution states: primary and backup. Only one instance of RTR 10 runs in primary state at any time; and it is this instance that has control over the restoration process and maintains communications with the DXCs 12. All other instances of RTR 10 run in backup state. If the primary RTR 10 fails, a backup RTR 10 automatically take over.

The RTR 10 that is running in primary execution state runs in one of two readiness modes at any time. The two readiness modes are "ready" and "alert". Ready mode is the nominal mode. In ready mode, RTR 10 performs normal processing, including DXC 12 audits and RTNDD 40 updates. When a network outage is declared by RTR 10, based on receiving alarms from the DXCs 12, that meet certain criteria, RTR 10 changes to alert mode. In alert mode, all unnecessary processing, such as audits, cease and RTR 10 prepares to perform processing required for restoration.

Additionally, the RTR 10 that is running in primary execution state can be run with dynamic route generation (DRG) 25 enabled or disabled. This can be selected by the user. When DRG 25 is enabled, restoration control 34 performs dynamic restoration by generating a restoration route in real-time. When DRG 25 is disabled, restoration control 34 performs a restoration pre-plan, which is input by the user. When an outage is detected by RTR 10 and its location has been isolated, RTR 10 presents to the user a list of impacted trunks. The user, through an external control system 16, either selects dynamic restoration (DRG 25 enabled), or selects to use pre-plans (DRG 25 disabled). As noted before, all user input is received by the RTR manager 32 and distributed to other processes, such as those in the restoration control 34.

Figure 4:
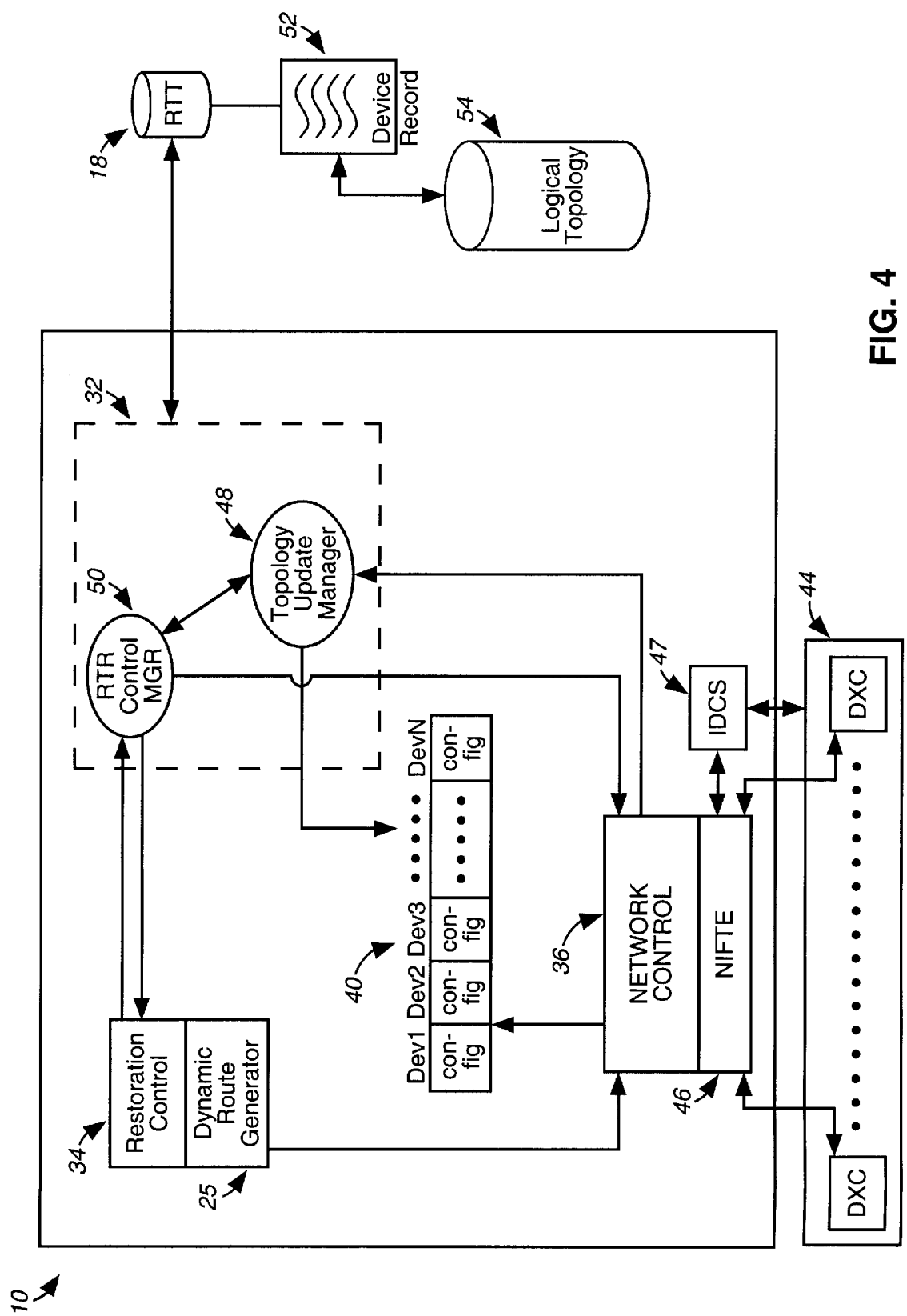
FIG. 4 is a block diagram of software components of a network restoration system of the present invention.

Now referring to FIG. 4 which is a block diagram of the software components that make up the structure of RTR 10, and in one embodiment the components that interface to the RTR 10. The components unique to the RTR 10 application, but not comprising the totality of the RTR 10 application, consists of: network control 44, network item front end (NIFTE) 46, RTNDD 40, topology update manager 48, RTR control manager 50, and restoration control 34.

The components that interface with the RTR 10 are the RTT 18, which maintains the logical topology 54 of the physical networks current status, and the network elements that make up the physical topology 44, such as the DXCs 12. The physical topology 44 is the actual network structure. The logical topology 54 is a virtual topology stored in the RTT 18 database consisting of binary records containing the current configuration of the physical database based upon user inputs. The physical topology 44 is based upon reporting of the network elements, such as DXCs 12, interfaced through network control 36.

Network control 36 is the process component within the RTR 10 application that communicates with the DXCs 12 through the NIFTEs 46. NIFTEs 46 maintain links between DXCs 12 and network control 36. The links allow network control 36 to distribute commands, such as connect and disconnect commands, to the DXCs 12. NIFTEs 46 receive communications from network control 36 in a nonspecific format and translates such information into a device specific format prior to sending commands to DXCs 12. Information is sent from DXCs 12 to NIFTEs 46 in a device specific format which NIFTEs 46 translates into a non-specific format which is sent to network control 36. An alternate link to each DXCs 12 allows communication to proceed if the first link fails. Network control 36 provides required network device status to the RTNDD 40 database following audits of network 14.

The functionality of network control 36 encompasses link management, interface control, issuing connect and disconnect commands, alarm notification, and audit of a network architecture. Network control includes and manages an administration link, an audit link, a connect and disconnect link, and an alarm link. These are logically defined functions that perform evaluation tests and analysis on network elements, such as DXCs 12, via the links that are established between network control 36 and the network elements. Administration commands set the DXC 12 identification, downloads alarm specifications, and determines the types of DXC 12 within the network architecture. The audit link acquires information about each DXC 12, such as how many ports are on a particular DXC 12, the current configuration of the ports, what ports are cross connected to what ports, the availability of the ports, the status of the ports, and the alarm state of the ports. The audit provides the latest and most current configuration of the DXCs 12 which is needed by the higher level applications. The connect and disconnect channel is reserved primarily for issuing connect and disconnect commands during an outage. The alarm link issues alarm notification if a port goes into alarm. Unsolicited alarms are also sent through an alarm link. RTNDD 40 is the repository of all this information.

RTNDD 40 is an internal database memory resident to RTR 10. The RTNDD 40 is a series of memory partitions, each partition representing a DXC 12. For example, if there were 117 DXCs 12 there would be 117 entries containing information on the status of each DXC 12. The information contained within each device slot is broken down into specifics of the device. RTNDD 40 contains a header of information which identifies each DXC 12. The RTNDD 40 also contains DXC 12 configuration information including the number of port entries for each DXC 12, the type of port, such as data type, and whether the port is provisioned as spare capacity or traffic. RTNDD 40 identifies which port is currently cross connected to another port within the DXC 12.

Network control 36 provides for the verification of spare trunk connectivity. Network control 36 ensures operational readiness of all network links though a system of messages that check for network device functionality. Network control 36 can abstract the specifics of the network hardware by providing a device independent command set which will allow control of any type of DXC 12 device. Network control 36 provides a front end interface, the NIFTEs 46, to the RTR 10 controlled network devices.

The NIFTEs 46 translate the hardware independent commands into the appropriate device specific command. NIFTEs 46 provide asynchronous alarm notification to any requesting RTR 10 component. NIFTEs 46 configure and audit the DXCs 12 such that only one full audit is required at the initial connection to the DXC 12. Subsequently, the DXCs 12 will be configured such that any DXC 12 configuration changes will trigger alarms which the corresponding NIFTE 46 will accept and record the configuration change or initiate the appropriate audit. This approach is called audit by exception and is designed to significantly reduce the processing burden on the RTR 10. NIFTEs 46 will support multiple software and hardware versions of the DXCs 12. NIFTEs 46 may issue several device commands, update the RTNDD 40, receive unsolicited alarms, receive new NIFTE 46 commands, and finally receive a response to the commands issued.

The connection from network control 36 to each DXC 12 consists of two redundant diverse paths. There is a third link to the DXCs 12 within the network 14 in case the primary two links of communication fail. The IDCS 47 provides this service to network control 36. This link is much more limited but it is a alternate path which can be used to issue connect and disconnect commands from RTR 10 to DXCs 12.

The update manager 48 updates the RTNDD 40, with regard to the partitions within the device record that contain the information or status about each DXC 12. The RTNDD 40 contains the information of all the DXCx 12 within the network topology. The update manager 48 updates the RTNDD 40 in real time to reflect the current status of the network topology.

Restoration control 34 encapsulates the functions that load and analyze network responses, accepts user and network break specifications, presents pre-plan lists in response to break specifications, and accepts a pre-plan specification for execution. In addition, restoration control 34 isolates breaks from real-time alarms received from the DXCs 12, generates routes for the break spec specified, and submits the routes for execution. The primary data elements of restoration control 34 are DXC 12 alarms, breaks, break specifications, routes, plans, and actions.

A DXC 12 alarm may be, for example, a notification from the DXC 12 that the status of a port has changed. A break is a complete collection of break specifications and includes an indication of the end of a break. Each break has a unique ID. A break specification is a message that specifies that a trunk break has been detected and may include a break location if the trunk break was successfully isolated between two DXC 12 ports. A route is the collection of actions required to restore a break specification. A plan is a collection of actions designed to restore a break. An action is an instruction to perform an intra-DXC 12 connect or disconnect between two ports. Breaks are isolated to a port level. Inactivity over a period of time indicates the end of a break. After break isolation has completed, routes are generated based on trunk priority order and dispatched to network control 36 for transfer to the DXC 12.

Figure 5:
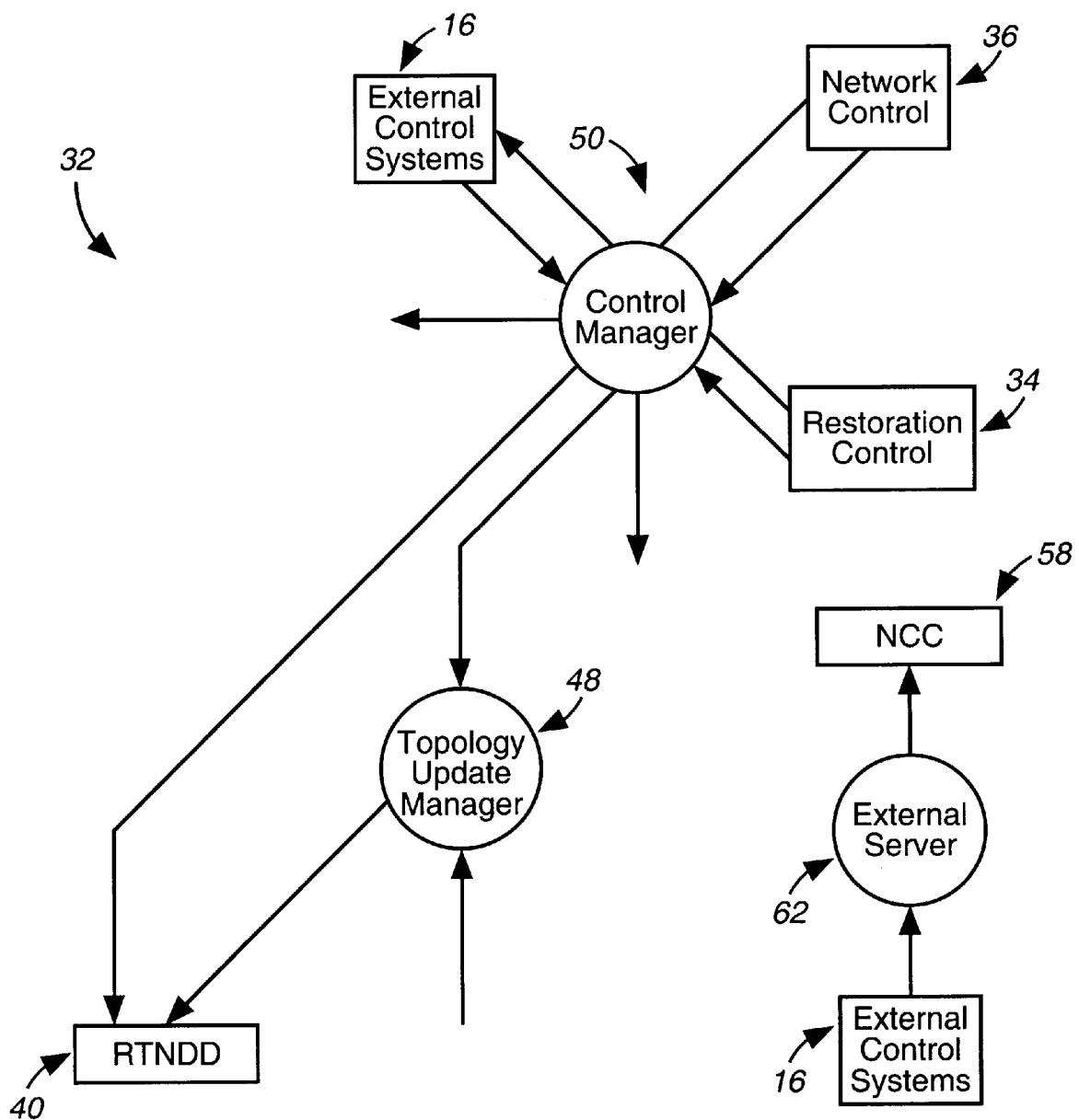
FIG. 5 is a block diagram of a control manager component of a network restoration system of the present invention.

FIG. 5 illustrates in detail the logical architecture of the RTR manager 32. Shown in FIG. 5 are the individual process components and the messages each process sends and receives. As noted before, each process can send messages to and receive messages from other processes.

There are two primary components unique to the RTR manager 32, a control manager 50 and a topology update manager 48. The control manager 50 serves as the interface to external systems. Control manager 50 receives commands from external control systems 16, distributes these commands to the appropriate internal processes, and ensures responses are returned when needed. For example, control manager 50 distributes commands to restoration control 34 and to network control 36. Control manager 50 can also distribute commands that are generated internally by RTR 10. Control manager 50 sends data to external systems as messages identified by internal commands.

Each command sent by control manager 50 to network control 36 has a corresponding response. For example, control manager 50 may send the following commands to network control 36. A command, which is provided by either a user or an external control system, that directs RTR 10 to change its execution state from primary to backup, or from backup to primary. This change in execution state is usually a result of a primary RTR 10 failing, and restoration control making a transition over to a backup RTR 10. Control manager 50 tracks the current execution state of each RTR 10 as an internal data parameter. In addition to updating the internal data parameter with the current execution state, control manager 50 notifies other processes of the change in execution state, which may result in starting up or shutting down of processes. This is done by sending messages to various internal control processes to either initiate processes for startup, or to terminate them for shut down.

Other commands are generated internally in RTR 10 and sent to control manager 50 when a network 14 outage is declared. A network 14 outage is declared when alarms received by DXCs 12 meet certain criteria, such as a specific number of alarms in a time interval. These criteria are used to eliminate spurious alarms that do not indicate an outage. When a network 14 outage is declared, control manager 50 sends out a command to change the readiness mode of RTR 10 from "ready" to "alert". In alert mode, all unnecessary processing, such as device audits and topology data updates, cease. When the outage is cleared, control manager 50 sends out a command to change the readiness mode of RTR 10 back to "ready". Control manager tracks the current readiness mode as an internal data parameter.

There are commands that instruct network control 36 to start and stop NIFTE 46 processes. A NIFTE 46 process is a component of network control 36 that serves as a communications interface with a DXC 12. There is a distinct instance of a NIFTE 46 process for each DXC 12. The start/stop NIFTE 46 commands can be generated internally upon startup of the RTR 10 system, or can be provided by an external system to request connection to a new DXC 12.

Commands are used and provided by an external control system 16 that instructs network control 36 to initiate, for example, a remote spares verification (RSV) process 56. The RSV process 56 is part of network control 36, and is described in reference to FIG. 5. External control systems 16 may also instruct network control 36 to initiate an audit of one or more DXC devices 12. This audit is performed by the NIFTE 46 component of network control 36, but the command message is sent to a network control coordinator (NCC) 58 component for distribution. This command is a request for a data read of the RTNDD 40, to be performed by the NIFTE 46.

Figure 7:
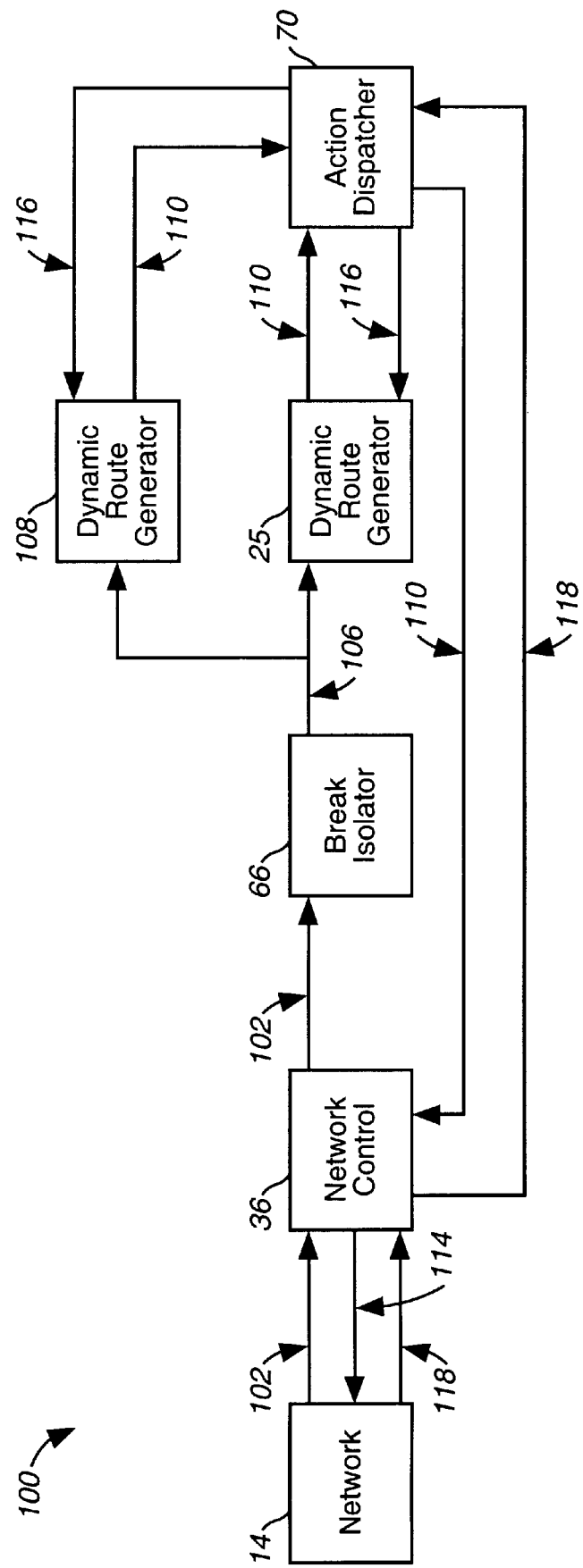
FIG. 7 is a block diagram depicting the present invention within a network restoration system.

The NCC 58 serves as the main interface and message distributor for the network control 36 component, and is described in reference to FIG. 7.

Commands received by control manager 50 and distributed to the restoration control 34 interface include the following: The change execution state command as described previously, the change DRG mode command, which instructs restoration control 34 to enable or disable DRG 25. When DRG 25 is enabled, restoration control 34 performs dynamic restoration. When DRG 25 is disabled, restoration control 34 performs pre-plan restoration. Control manager 50 tracks the current DRG 25 mode as an internal data parameter.

After an outage is cleared, a normalization plan is sent to the restoration control 34 to return the DXCs 12 to their original state prior to the outage. This normalization plan is sent from the user display (20) system (PC) or (WS) directly to the restoration control 34. In addition to responses to change execution state and change DRG mode commands, the control manager 50 receives from restoration control 34 a restoration status message. This message provides data on the current status of a restoration process.

The topology update manager (TUM) 60 is responsible for updating data in the RTNDD 40. TUM 60 receives external data on network 14 topology from RTT 18. TUM 60 makes appropriate updates to RTNDD 40. The TUM 60 also receives messages from the NIFTEs 46 indicating that the results of a DXC 12 audit are not consistent with what is reflected in the RTNDD 40 for that DXC 12. While the NIFTE 46 is responsible for making some updates to RTNDD 40, the TUM 60 is responsible for making other updates. If the NIFTE 46 notes an inconsistency of data in the RTNDD 40 for which it is not responsible for updating, it will send a request to the TUM 60 to reconcile the data in the RTNDD 40.

An external server 62 may serve as a front-end focal point to control manger 50 for receiving input from and providing output to external systems. The external server 62 may be incorporated into the control manager 50. Additional messages sent directly by this component, as shown in FIG. 5, may include a command that registers an external system as a client for alarms received. External systems, as well as internal RTR 10 processes, can register to receive certain types of alarms. When network control 36 receives alarms from DXCs 12, it determines a list of alarm recipients, and distributes the alarms accordingly.

The external server 62 may send commands to the NCC 58 that request the NIFTEs 46 to issue a port connect or port disconnect command to a DXC 12. While the restoration control 34 component generates these commands to implement a restoral route, RTR 10 may also receive these commands from external control systems 16.

Figure 6:
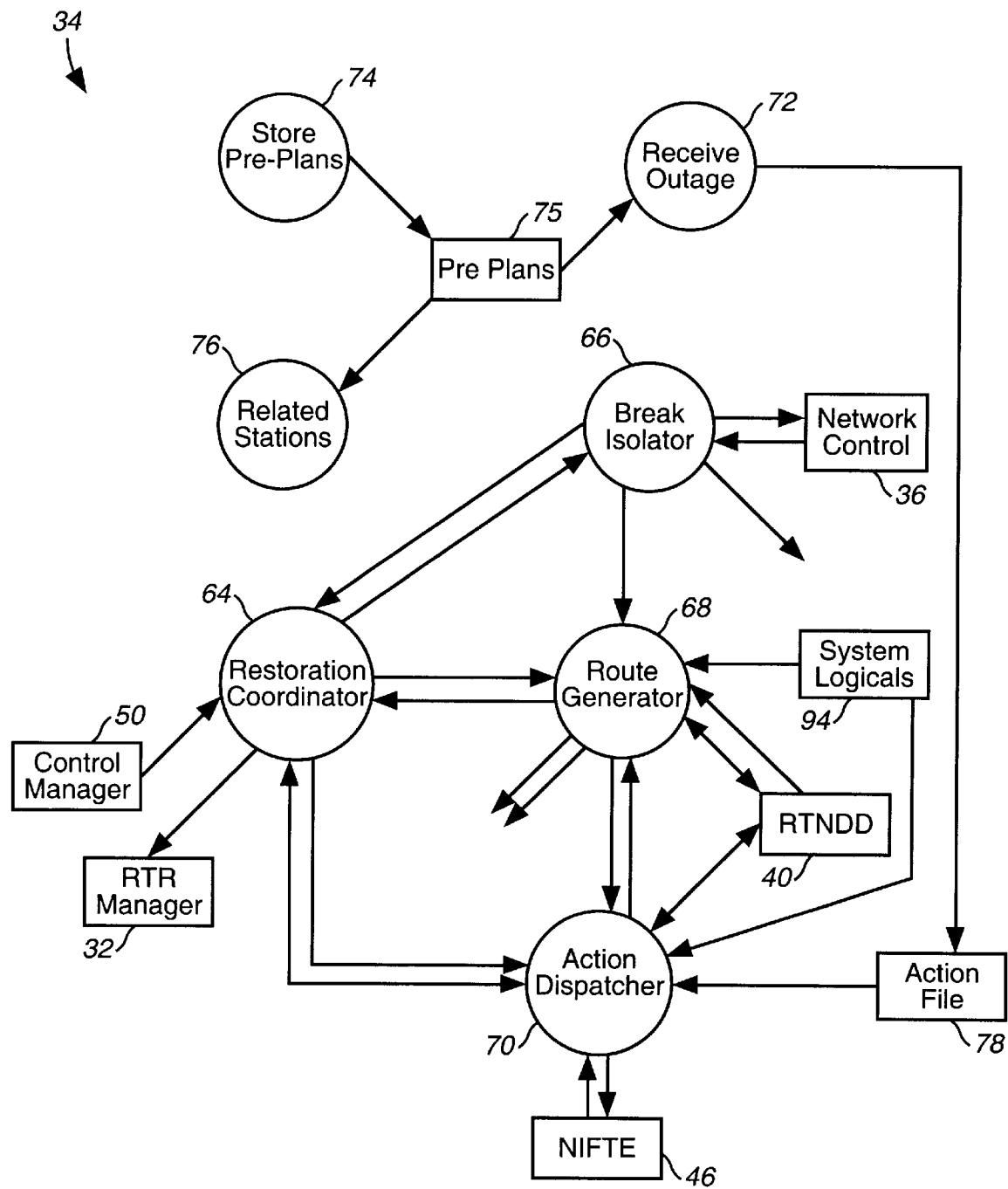
FIG. 6 is a block diagram of a restoration control component of a network restoration system of the present invention.

FIG. 6 illustrates in detail the logical architecture of restoration control 34. Restoration control 34 is comprised of four key components, restoration coordinator 64, break isolator 66, route generator 68, and action dispatcher 20.

The restoration coordinator 64 serves as the main interface for all processes within restoration control 34. When RTR 10 starts up and is placed in primary execution state, the restoration coordinator 64 establishes communication with each of the other restoration control 34 process components. The restoration coordinator 64 receives commands from external control systems 16 via the control manager 50, and distributes them to the appropriate processes within restoration control 34. Distribution of commands to other processes often requires a specific timing and sequence, which the restoration coordinator 64 controls. The restoration coordinator 64 also communicates restoration status to the RTR manager 32.

The break isolator 66 is responsible for receiving DXC 12 alarms from network control 36, identifying the trunk 30 impacted (both traffic trunks and spares), and isolating the location of the outage, or break.

When a network 14 outage occurs, DXCs 12 sends unsolicited alarms to RTR 10. These alarms are received by NIFTEs 46 and passed on to the break isolator 66 in messages. The break isolator 66 collects alarms and maintains a list of active alarms.

The break isolator 66 registers for receipt of all alarms and it sends a message to network control 36. This message instructs network control 36, and specifically the NIFTEs 46 to send the break isolator 66 alarms generated by DXCs 12. NIFTEs 46 return a response message to confirm. The break isolator 66 then begins receiving alarms from the network 14. Alarms will be received even when no outage has occurred. These alarms are spurious, and may be generated for a variety of reasons, such as detection of a weakened signal.

The break isolator 66 applies certain criteria to active alarms to determine if an outage has occurred. Such criteria includes the number of alarms received in a time interval. The break isolator 66 also waits a predetermined time before declaring an outage. The break isolator 66 uses topology data from the RTNDD 40 to correlate alarms to determine if multiple alarms are related and uses tunable thresholds to determine if alarms are a probable result of an outage. The break isolator 66 then determines the location of the outage to a trunk segment 30 between two restoration devices, typically DXCs 12. The break isolator 66 then sends this specification of the outage to the route generator 68. If DRG 25 is disabled, and restoration pre-plans are to be used, the break isolator 66 tracks the list of impacted trunks to ensure each one is successfully restored by a pre-plan.

The route generator 68 receives break specifications from the break isolator 66 and generates restoral routes, if DRG 25 is enabled.

The route generator 68 first sends a restoration status message to the restoration coordinator 64, indicating that restoration is in process. This triggers the restoration coordinator 64 to notify the control manager 50 to place RTR 10 in a readiness mode of "alert."

Route generator 68 reads data from RTNDD 40, and uses this data to determine an optimal restoral route for each impacted trunk based upon traffic trunk priorities. This determination should take into account the costs of different restoral routes. Such cost data is derived. For example, based upon capacity type number of segments, distance, and the number of connections.

RTNDD 40 is also queried for a list of available spare trunks that can be used for restoral routes. If a break specification is received for a spare trunk, the route generator 68 updates RTNDD 40 to indicate this spare is broken and is not available for restoral routes.

When a restoral route is determined, route generator 68 identifies each port on each DXC 12 that is needed for the restoral route and formulates commands needed to implement the route which generally comprise port connects and disconnects in DXCs 12. These commands are in a generic format, in that they refer to DXC 12 devices and ports in a generic manner. These generic commands will be translated to actual commands needed for specific DXC 12 by the NIFTEs 46. Route generator 68 creates a file of these commands, and then provides this file to the action dispatcher 70.

The action dispatcher 70 receives commands from the route generator 68 for implementing the restoral route. The action dispatcher 70 distributes these commands directly to the NIFTEs 46, bypassing the NCC 58 for performance reasons. Since there is an individual NIFTE 46 process running for each DXC 12, the action dispatcher 70 must distribute individual commands to certain NIFTE 46 processes.

If DRG 25 is disabled, the route generator 68 does not perform any route generation. The action dispatcher 70 receives an action file 78 from receive outage 72. The action file 78 contains actions needed to implement a restoral route. These actions are in the same format as those received from route generator 68, except they have been specified by a restoration pre-plan. The action dispatcher 70 distributes these commands to individual NIFTEs 46.

Restoration control 34 also consists of other components used in the pre-plan restoration process load preplans 74, and receive outage 72 are used to download appropriate restoration pre-plans 75 from an external control system 16, and submit them to action dispatcher 70 for implementation. Thus, the present invention combines the ability to execute pre-plans with a dynamic network restoration system on the same platform. Restoration control 34 is responsible for initiating the main processing loops of the other components. This is performed at startup of RTR 10 by receiving a message from the control manager 50.

Alternative to the processes previously described, the break isolator 66, when it has compiled a list of impacted trunks, may present this list to the user via the user display 20. RTR 10 then allows the user to either select a pre-plan 75 for each trunk or to select dynamic restoration.

If the user selects DRG 25, then the break isolator 66 sends the break specification to the route generator 68. The route generator 68 proceeds with dynamic restoration, as previously described. If the user selects a pre-plan 75, then the break isolator 66 does not need to determine the location of the impacted trunk segments 30. There will be a pre-plan 75 provided for the outage. These pre-plans 75 are downloaded and provided by the load pre-plans 74 and receive outage 72 components. They are provided directly to the action dispatcher 70 in an action file 72. However, the break isolator 66 maintains the list of impacted trunks to ensure each one gets restored. If a pre-plan 75 does not get implemented successfully, the break isolator 66 will present the impacted, unrestored trunks to the user again, and allow the user to select either another pre-plan 75, or dynamic restoration.

The present invention is designed so as to perform action dispatching functions for any type of telecommunications network, the network 14 is defined by the type of DXC 12 used. This includes action dispatching to dynamically setup customer calls on-demand, and dynamically configure a network 14 for virtually any purpose. The present invention is ideally suited for action dispatching in a network restoration system, in which the actions are used to implement restoration routes in the event of a network 14 outage 762. For the remainder of this description, the network 14 restoration example is described only for exemplary purposes and not by way of limitation.

FIG. 7 is a block diagram illustrating an example of the present invention's use in a network restoration system 8 and is denoted generally as 100. The present invention is an action dispatcher 70. The action dispatcher 70 is responsible for receiving actions 110 from either a DRG 25 or a restoration pre-plan selection system 108. These actions 110 specify port connect and disconnect actions 110 needed to be executed by various DXCs 12 in order to implement restoration routes. Actions 110 coming from a DRG 25 are used to implement restoration plans that are dynamically generated in response to an outage 762. Actions 110 coming from pre-plan selection system 108 are used to implement restoration routes that have been determined prior to an outage 762, and are part of a restoration pre-plan.

A network 14 represents a network architecture equipped with DXC 12 that can be used to re-route traffic in the event of an outage 762. The ports of a DXC 12 are built such that if they detect a loss of signal, a degradation of signal, or a change in signal type, they will generate an alarm 102. Port alarms 102 are sent to a network control 36, which serves as the interface to RTR 10. NIFTE 46, a component within network control 36, is a software component that performs communications management, data translations, and protocol conversions. The network control 36 passes alarms 102 on to a break isolator 66.

The break isolator 66 receives port alarms 102 that were generated on the network 14. The break isolator 66 performs various analysis processes to filter out alarms 102 that are not the result of a network outage 762, to identify all trunks 30 impacted by an outage 762, and to isolate the location of the outage 762 between the nearest two DXCs 12. The break isolator 66 also identifies if there is possibly more than one outage 762.

The break isolator 66 then produces break specifications 106. These specifications are messages that specify each trunk 30 that requires restoration, and the two DXCs 12 on each trunk 30 needed for restoration. These are the two DXCs 12 between which the break isolator 66 has isolated the outage 762, usually the two DXCs 12 nearest the outage 762.

The break specifications 106 produced by the break isolator 66 are then sent to either a DRG 25 or a restoration pre-plan selection system 108, depending on the particular mode in which the overall restoration system is running, or depending on the selection of an external user or control system.

The DRG 25 retrieves the logical topology from RTNDD 40 and generates restoration routes for each trunk 30 identified in a break specification 106. The DRG 25 also determines the actions 110 to send to the various DXCs 12 to implement each restoration route. These actions 110 are then provided to the action dispatcher 70. Restoration pre-plan selection 108 is a system in which a user selects a restoration pre-plan for the trunks 30 identified in the break specifications 106. A pre-plan specifies actions needed to implement the restoration routes for each trunk 30, the actions 110 being provided to the action dispatcher 70.

The action dispatcher 70 dispatches the actions 110 to particular network control 36 instances. In one preferred embodiment of the network control 36, there will be a distinct network control 36 process running for each network DXC 12 in the network 14. The network control 36 formulates device-specific commands that specify these actions, and then issues these action commands 114 to the network 14.

Any action command 114 that is issued to a DXC 12 may succeed or fail. A response is returned to the network control 36 indicating such. These responses are then returned to the action dispatcher 70. The action dispatcher 70 analyzes the responses to determine if a restoration route was successfully implemented. If the route was successfully implemented, the action dispatcher 70 determines if any ports on the restoration route are in alarm 102. If not, then the action dispatcher 70 declares the restoration route successful and issues a results message to the submitter of the restoration route actions, either the DRG 25 or the restoration pre-plan selection 108.

If the action dispatcher 70 determines that a restoration route was not successfully implemented, or it determines that one or more ports in the restoration route are in alarm 102, then it issues actions to the network 14, via network control 36, to normalize the network 14. That is, it issues actions to "undo" those commands that were executed in the failed restoration route. The action dispatcher 70 then sends a results message 116 to the submitter of the restoration route actions.

This general process is performed in different ways, depending on whether action dispatcher 70 is used for dynamic routing or pre-plan routing. There are other process performed to normalize a network 14. There are finer details in the processes performed by the action dispatcher 70 that increase both the performance and accuracy of the overall restoration system in which the action dispatcher 70 is used. Descriptions of detailed processes are provided in reference to FIGS. 8–17.

In summary, the general process performed by the action dispatcher 70 is as follows (these steps do not correspond to the steps specified in FIG. 7, which show the process performed by an overall network restoration system 8 as described above):

Initialization is performed by the action dispatcher 70 when the action dispatcher 70 is notified by either the DRG 25 or the restoration pre-plan system 108 that an action file 78 is ready for processing. The action dispatcher 70 reads current system runtime parameters, such as execution state, to determine whether or not the action dispatcher 70 is to perform. If so, the action dispatcher 70 changes an operational mode parameter from "ready" to "alert" to notify the overall restoration system that restoration is in progress, and to cease all unnecessary processing so as to make all system resources available.

The action dispatcher 70 receives action file 78 containing a series of actions 110 needed to implement one or more restoration routes.

The action dispatcher 70 dispatches actions 110 to appropriate network control 36 instances and sets timers that will determine if restoration route times out.

The action dispatcher 70 receives responses 118 from the network control 36 instances. If the corresponding timer expires before responses to all actions 110 for a single route are received, action dispatcher 70 declares the route to be timed out.

Action dispatcher 70 then sends commands to normalize network 14 and sends results 116 of route time-out to the action submitter (DRG 25 or restoration pre-plan system 108)

Alternatively, when all responses are received before timer expires, the action dispatcher 70 declares route completed and verifies the route by seeing if any ports are in alarm 102. If any ports are in alarm 102, the action dispatcher 70 will declare the route failed, normalize network 14 and send results 116 of route failed to the action submitter.

If no ports are in alarms 102, action dispatcher 70 declares route successful and sends results 116 to the action submitter.

Figure 8:
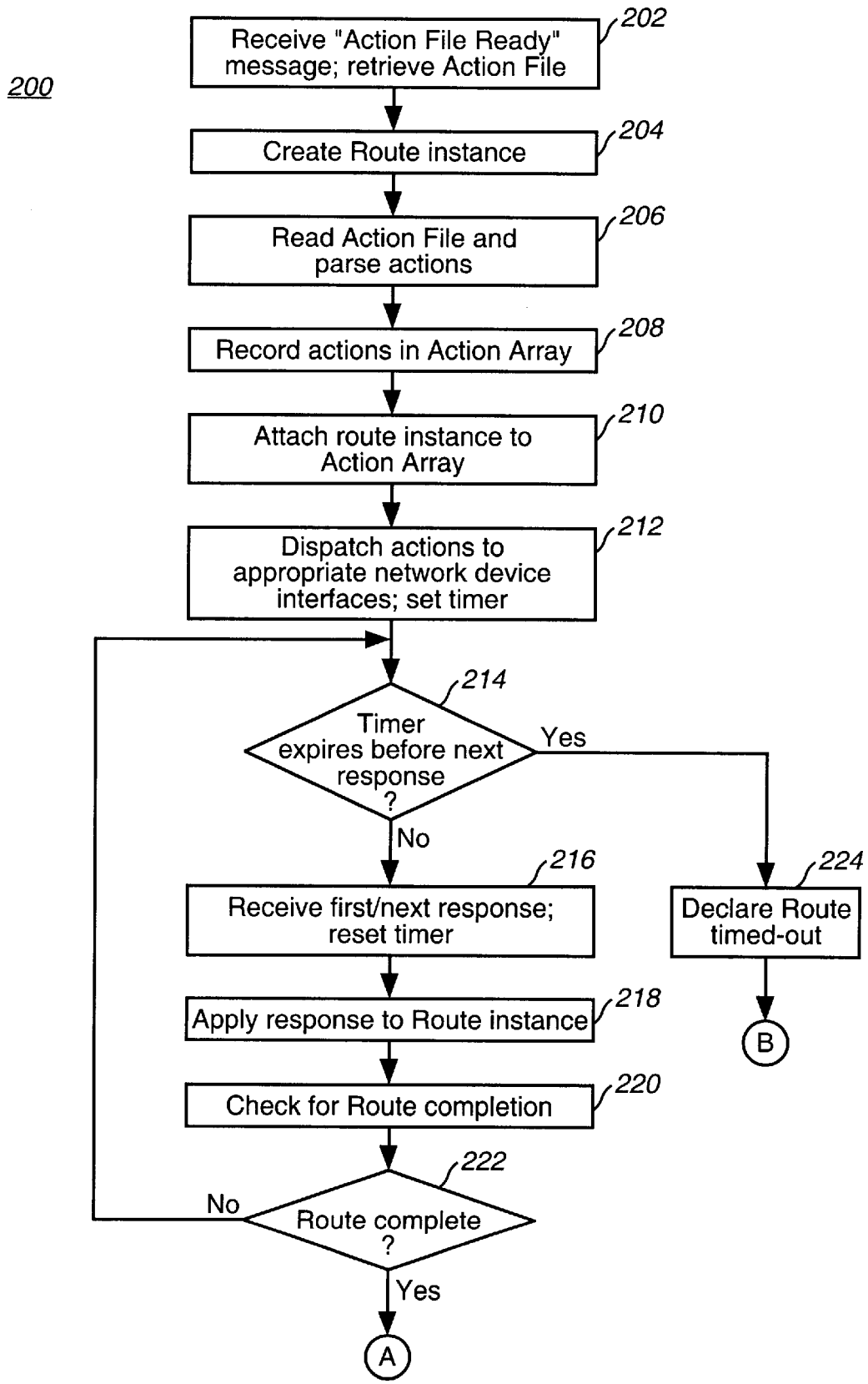
FIGS. 8–15 are flow chart detailing the sequence of operations of the present invention.
Figure 9:
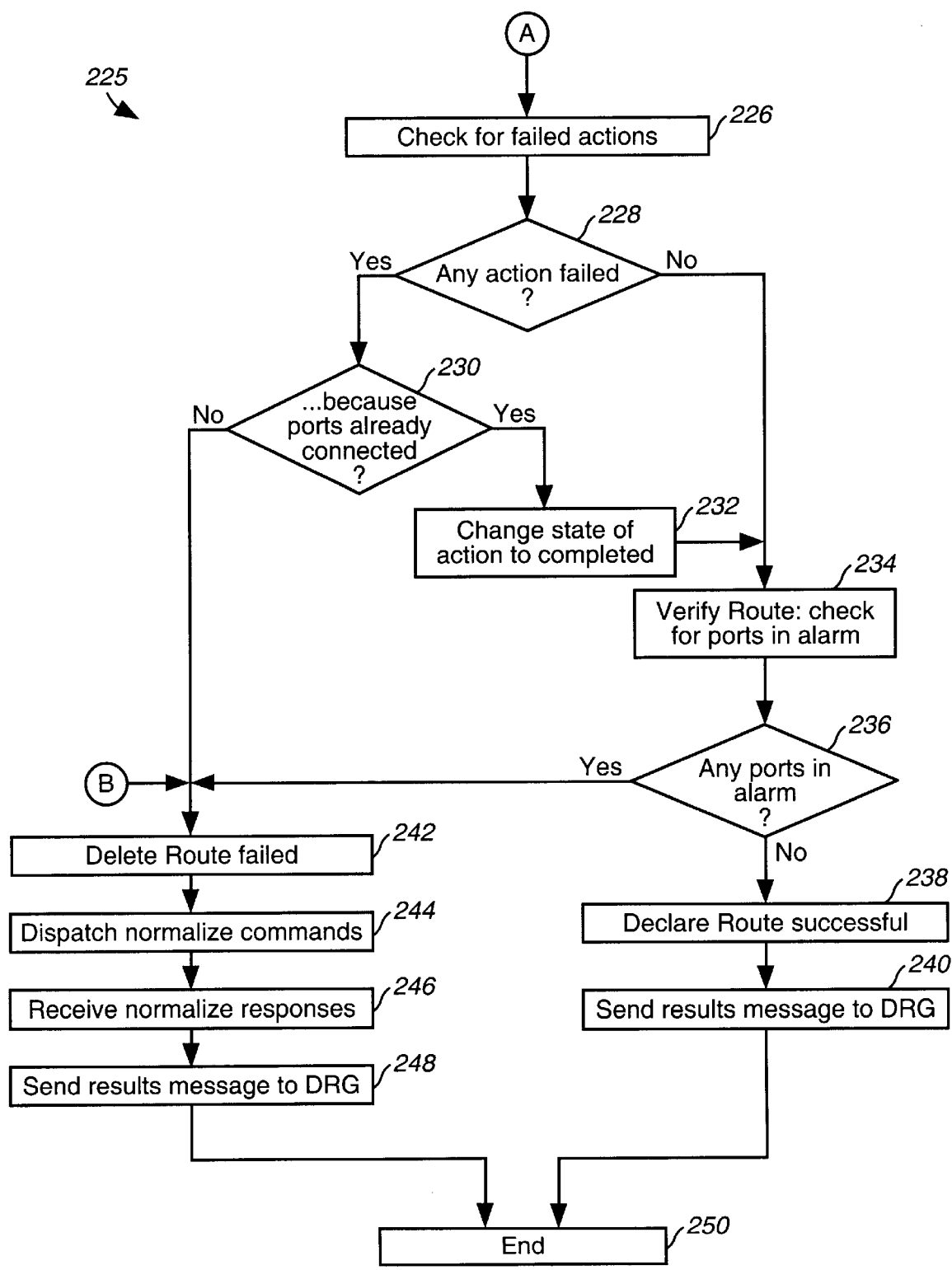

FIGS. 8 and 9, denoted generally as 200 and 225 respectively, are a flowchart illustrating the process performed by the action dispatcher 70 to dispatch actions generated by a DRG 25, and then to verify the route was successfully implemented.

In step 202, the action dispatcher 70 receives a message from a DRG 25 indicating that an action file 78 has been created and is ready for processing. This action file 78 contains actions 110 that were created by the DRG 25 and will be used to implement various restoration routes. The message may also specify a directory from which to retrieve the action file 70.

The action dispatcher 70 then retrieves the action file 78 from the specified directory.

In step 204, the action dispatcher 70 creates an instance of a route. This route represents that which will be implemented by the actions 110 in the action file 78. The route instance is simply a temporary memory allocation used by the action dispatcher 70 to track the status of the route.

Figure 10:
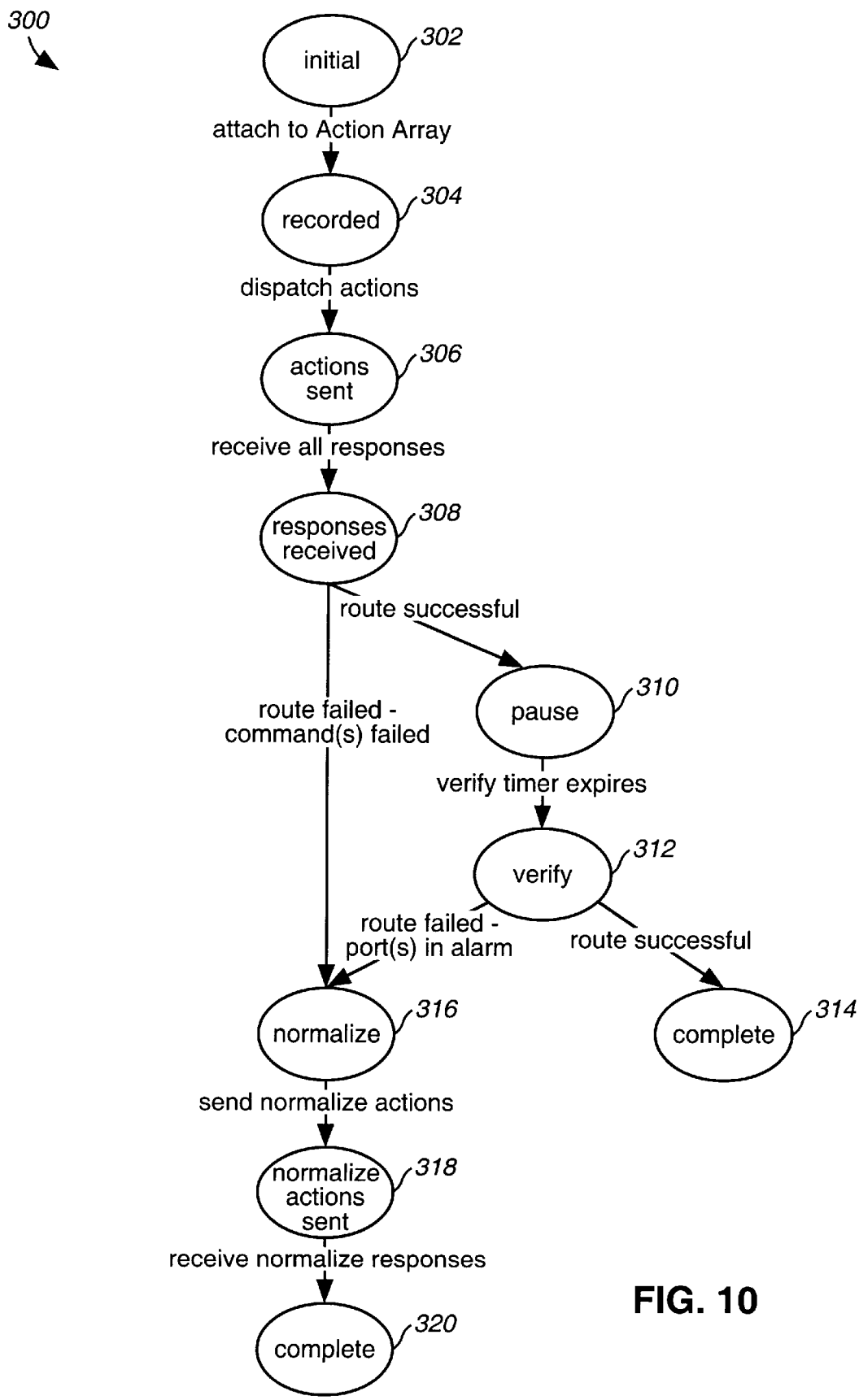

The route instance created in step 204 will undergo various state transitions. These states and transitions are illustrated in FIG. 10 and denoted generally as 300. When the route instance is created in step 204, the route instance is in a state of "initial" 302.

In step 206, the action dispatcher 70 reads the action file 78 and parses the actions 110. The actions in the action file 78, having been generated by a DRG 25 are in a specific format that is readily used by the action dispatcher 70. An action 110 in this format will generically identify the DXC 12, the ports, and the actions 110 to be taken on the ports.

Actions 110 are received by the action dispatcher 70 in an action file 78 so that if the system crashes during execution, the system can be re-started and proceed from origination of crash. The action dispatcher 70 simply reads the action file 78 to determine the last action that was parsed in step 206.

In step 208, the action dispatcher 70 records the actions 110 in an internal array. Each entry in the array will be an action 110, specifying the DXC 12, ports, and action 110 to be taken. This array will be referred to as the action array. There is an action array for each route to be implemented.

In step 210, the action dispatcher 70 attaches the route instance (created in step 204) to the action array. Thus, the action array has the route identified and can be used to track the status of the route, via tracking the status of each action 110, throughout the remaining process.

When the route instance has been attached to the action array in step 210, the action array state changes to "recorded" 304, as shown in FIG. 10. When the route state changes to recorded 304, the action dispatcher 70 is triggered to begin dispatching actions 110.

In step 212, the action dispatcher 70 dispatches the actions 110 in the action array to network control 36 which distributes the action 110 to the appropriate NIFTE 46. Each action 110 goes to a particular DXC 12. The intended DXC 12 for each action 110 is identified in the action 110. The action dispatcher 70 sends the action 110 to network control 36 to an instance of NIFTE 46 that corresponds to the intended DXC 12.

When the actions 110 for a route instance have been dispatched in step 212, the routes state changes to "actions sent" 306, as shown in FIG. 10.

When all actions 110 for a route have been dispatched to network control 36, the action dispatcher 70 sets a timer. This timer, the length of which may be determined by the user (i.e., 30 seconds), is used to time-out the route on a response level. That is, the timer is reset when the next response is received by the action dispatcher 70. If the timer expires before a next response is received, the route is declared by the action dispatcher 70 to have timed-out.

Step 214 determines if the timer expires before the first or next response is received. If the timer does not expire, then in step 216, the first/next response is received by the action dispatcher 70. When each response is received, the timer is reset. Thus, if the timer is set to 30 seconds, the action dispatcher 70 allows 30 seconds between responses before declaring the route timed-out.

The response 118 received in step 216 for each action dispatched in step 212 will indicate the DXC 12, ports, and action 110 attempted, so that the response 118 can be associated with the original action 110 that was sent. The response 118 will also indicate if the action succeeded or failed.

In step 218, the action dispatcher 70 applies the response 118 to the route instance by updating the action array. The response indicates in the appropriate action entry of the action array whether the action succeeded or failed.

In step 220, the action dispatcher 70 checks for route completion. This occurs every time a response 118 is received. The action dispatcher 70 reads the action 110 array to determine if responses 118 have been received for each action 110. If so, the route is complete.

Step 222 determines if the route is complete. If the route is not complete, as determined by having one or more actions 110 without responses, then the process returns to step 214, where either the timer will expire or a next response 118 will be received. Steps 214–222 represent the process of receiving all responses 118 for a route.

If the timer that is set for each response 118 received ever expires, as determined in step 214, then in step 224, the action dispatcher 70 declares the route timed-out. In step 242, the route is declared failed for the reason of a time-out.

In step 244, the action dispatcher 70 dispatches commands to normalize the network 14. This is to undo those actions 110 that were implemented successfully in order to restore the original route. The action dispatcher 70 determines from the action 110 array which actions 110 completed successfully. For these actions 110, the action dispatcher 70 dispatches the reverse actions in reverse order. For example, if the following actions 110 were implemented successfully in the order shown:

Device A: disconnect port 1 port 2
Device A: disconnect port 3 port 4

Device A: connect port 1 port 3

Device B: disconnect port 5 port 6

Device B: connect port 5 port 7 then to normalize the network 14, the action dispatcher 70 dispatches these actions:

Device B: disconnect port 5 port 7

Device B: connect port 5 port 6

Device A: disconnect port 1 port 3

Device A: connect port 3 port 4

Device A: connect port 1 port 2

In step 246, the action dispatcher 70 receives responses for the normalize commands that were dispatched in step 244.

In step 248, the action dispatcher 70 sends a results message to the DRG 25, indicating that the route failed for the reason that the route timed-out. The process for this particular route then ends with step 250.

If the route completes, as determined in step 222 when the action dispatcher 70 determines that responses for all actions 110 have been received, then the state of the route instance changes to "responses received" 308, as shown in FIG. 10.

In step 226, the action dispatcher 70 reads the action array to check for any actions 110 that failed. This is determined in step 228. If no actions 110 failed, then in step 234, the action dispatcher 70 verifies that the newly implemented restoration route is working. This may be done by querying a RTNDD 40 for alarm 102 status on each DXC 12 port that comprises the restoration route. RTNDD 40 is a database is updated in real-time with alarm 102 state changes for each port. If a port goes into alarm 102, the DXC 12 record will indicate such in the RTNDD 40. The action dispatcher 70, in step 234, reads the RTNDD 40 to determine if any ports of the newly implemented restoration routes are in alarm 102.

Alternatively, in some embodiments, a possibility exists for responses 118 received in step 216 to indicate if either port involved in the action 110 went into alarm 102. This is dependent on the make of the DXC 12.

Alternatively, in other embodiments, the action dispatcher 70 can request to receive alarms 102 from the network control 36. Thus, when network control 36 receives a port alarm 102 from network 14, in addition to sending an alarm 102 to the break isolator 66, network control 36 will also send an alarm 102 to the action dispatcher 70. In this way, the action dispatcher 70 can keep an internal list of all ports in alarm 102, and then query this list in step 234 to determine if any ports of the newly implemented restoration route are in alarm 102.

When the action dispatcher 70 has determined in step 228 that no actions 110 failed, the state of the route instance changes from "responses received" 308 to "pause" 310, as shown in FIG. 10. At this time, a verify timer is set. This timer will trigger the verification process in step 234. When the timer expires, the state of the route instance changes to "verify" 312 and step 234 occurs.

Step 236 determines if any ports are in alarm 102. If not, then in step 238, the action dispatcher 70 declares the route successful, and sends a results 116 message in step 240 indicating such to the DRG 25.

When the route is declared successful in step 238, the route state changes to "complete" 314. Each route instance must end in a state of "complete", whether or not the route succeeds. If a route fails, it is placed in a state of "complete" 320 when it is normalized.

If any ports are in alarm 102, then in step 242, the action dispatcher 70 declares the route failed. The action dispatcher 70 normalizes the network by dispatching normalize commands in step 244 to tear down the failed route and restore the original route. In step 246, the action dispatcher 70 receives responses to the normalize commands. In step 248, the action dispatcher 70 sends a results 116 message to the DRG 25, indicating that the route failed for the reason that one or more ports were in alarm 102. The process for this particular route then ends with step 250.

When, in step 236, one or more ports that are in alarm 102 are determined and the route is declared failed in step 242, the route state changes to "normalize" 316. When normalize commands are sent in step 244, the route state changes to "normalize actions sent" 318. When normalize responses are received in step 246, the route state changes to "complete" 320.

Returning to step 228, if the action dispatcher 70 determines that one or more actions 110 failed, then the action dispatcher 70 must determine the reason for failure. If an action 110 was a connect action 110 and failed because the two ports were already connected, then this failure of an action 110 will not result in a failure of the route. In step 232, the action dispatcher 70 changes the state of the action 110 in the action 110 array to completed, because the results are the same, i.e., the ports are connected. The process continues with step 234.

If the action dispatcher 70 determines in step 230 that one or more actions failed due to a reason other than "the ports were already connected," then in step 242, the action dispatcher 70 declares the route failed. The action dispatcher 70 normalizes the network 14, and in step 248, it sends a results message 116 to the DRG 25, indicating that the route failed for the reason that one or more actions 110 failed. The process for this particular route then ends with step 250.

When the action dispatcher 70 determines in step 230 that the route failed, and declares such in step 242, the route state changes to "normalize" 316. When normalize commands are sent in step 244, the route state changes to "normalize actions sent" 318. When normalize responses are received in step 246, the route state changes to "complete" 320. There may be other reasons for the action dispatcher 70 to declare a route failed, and the specific reason will be stated in the results message 116 sent to the DRG 25 in step 248. These reasons include: execution state indicator not set to "primary" (if restoration system is implemented in a multiple redundancy scheme, with one RTR 10 running in "primary" state and others are running in "backup" state); DRG 25 process not enabled (if dynamic restoration system is combined with pre-plan system, and pre-plan methodology is currently being used); restoration route timed out (determined in step 214; declared in step 224); one or more actions failed (determined in step 230; declared in step 242); or one or more ports connected in the restoration route are in alarm 102 (determined in step 236; declared in step 242).

Figure 11:
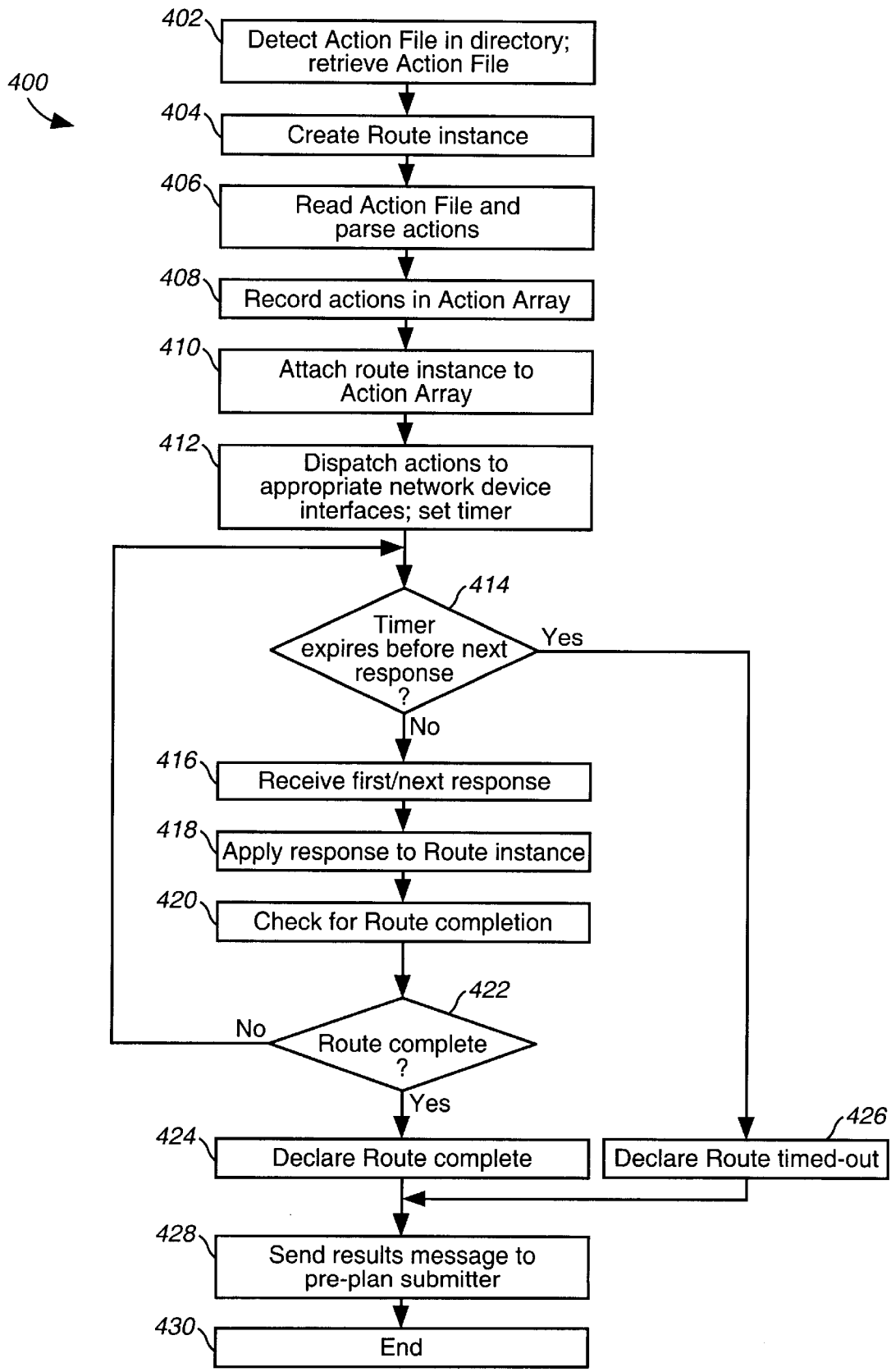

FIG. 11 is a flowchart illustrating the process performed by the action dispatcher 70 to dispatch actions 110 that are specified in a restoration pre-plan or as part of the network normalization process once the cause of an outage 762 has been corrected and is denoted generally as 400. The distinction in whether process 400 is used to perform pre-plan restoration action dispatching or normalization is indicated in the action file 78.

If pre-plan restoration action 110 dispatching is to be performed, the action file 78 will contain actions 110 to do just that. If normalization is to be performed, the action file 78 will contain actions 110 to do just that.

Process 400 will now be described as the process 400 is performed for pre-plan restoration action 110 dispatching. The process 400 is similar to that for dynamic route action 110 dispatching shown in FIGS. 8 and 9, except that no verification of a completed route is performed. The results are simply passed to the restoration pre-plan system 108. The restoration pre-plan system 108 or a user thereof can then perform actions 110 necessary in response to a failed or successful route.

In step 402, the action dispatcher 70 detects an action file 78 in a directory that is specified for such purpose. This eliminates the need for the restoration pre-plan system 108 or a user to notify the action dispatcher 70 via a message that an action file 78 is ready. The user simply selects a pre-plan in the restoration pre-plan system 108. An action file 78 for the pre-plan is then placed in a specified directory. The action dispatcher 70 detects the presence of the action file 78 in step 402 and retrieves the action file 78.

Steps 404 through 410 are performed analogous to steps 204 through 210 in FIG. 8. Because actions 110 are coming from an external component (restoration pre-plan system 108), they may be in a different format. If so, the action dispatcher 70 performs format translation in step 406, in addition to action parsing.

Figure 12:
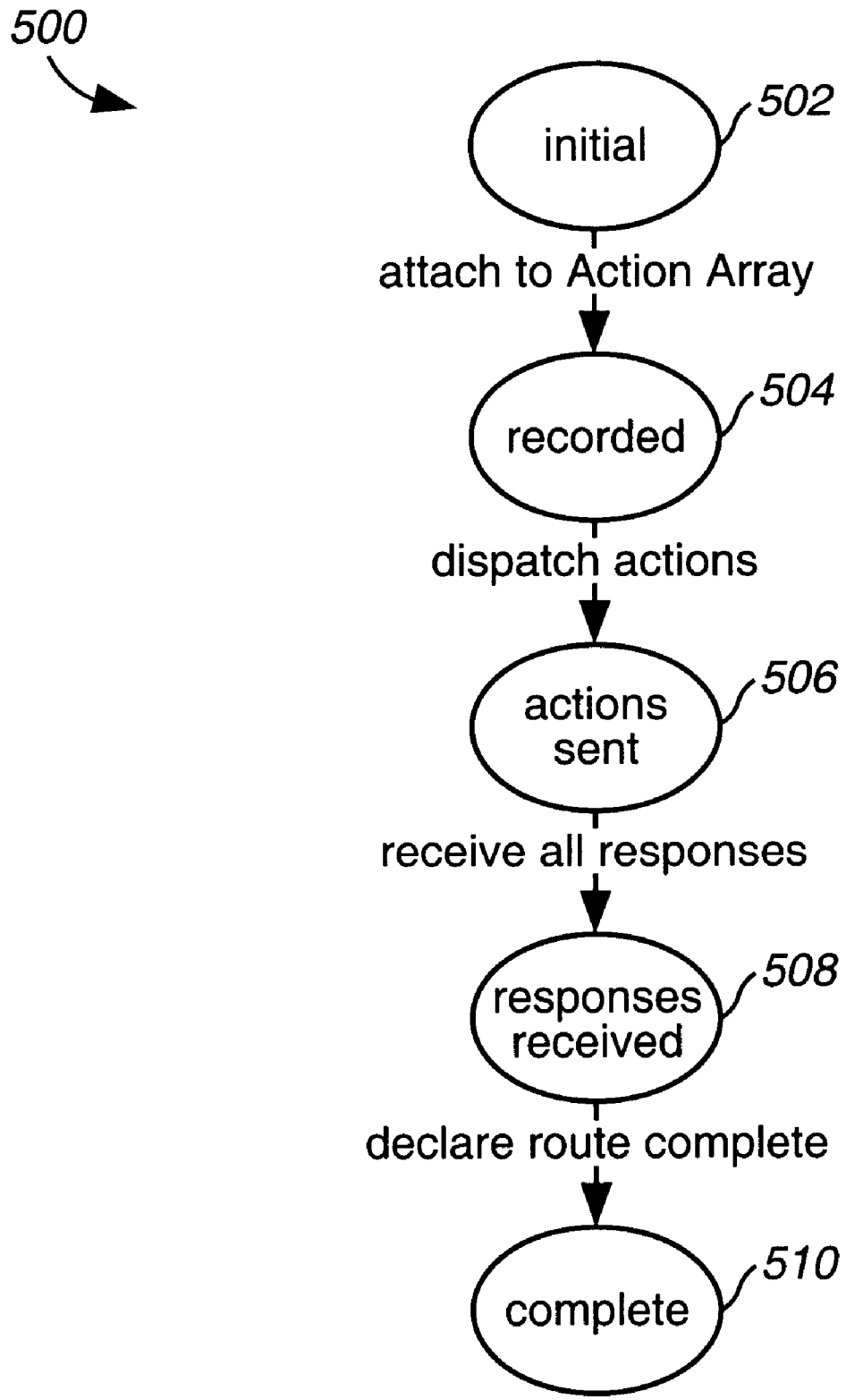

A route instance that represents an entire pre-plan is created in step 404 and will undergo various state transitions. These states and transitions are illustrated in FIG. 12. When the pre-plan route instance is created in step 404, it is in a state of "initial" 502. When the pre-plan route instance is attached to the action array in step 410, its state changes to "recorded" 504. In step 412, the action dispatcher 70 dispatches the actions 110 in the action array to the appropriate network control 36. Each action 110 goes to a particular DXC 12. The DXC 12 for each action 110 is identified in the action 110. The action dispatcher 70 sends the action 110 to an instance of the network control 36 that corresponds to the DXC 12.

When the actions 110 for a pre-plan route instance have been dispatched in step 412, the pre-plan route instances state changes to "actions sent" 506, as shown in FIG. 12. When all actions 110 for a pre-plan route instance have been dispatched to network control 36, the action dispatcher 70 sets a timer. This timer, which may be determined by the user to be any amount (i.e., 30 seconds), is used to time-out the pre-plan route instance on an entire plan level. The timer is reset when each response 118 is received. This allows the process to proceed as long as the time period between responses does not exceed the specified amount. If the timer expires before all responses for a pre-plan route instance are received, the pre-plan is declared by the action dispatcher 70 to have timed-out.

Step 414 determines if the timer expires before the first or next response is received. If the timer does not expire, then in step 416, the first/next response is received by the action dispatcher 70. The timer is not reset. Steps 418 through 422 are performed analogous to step 218 through 222 in FIG. 8. If the pre-plan completes, as determined in step 422 when responses 118 for all actions 110 in a pre-plan route instance have been received prior to expiration of the timer, then in step 424, the pre-plan is declared complete.

The state of the route instance then changes to "responses received" 508, as shown in FIG. 12. When the pre-plan is declared complete in step 424, the state changes to "complete" 510. If the timer expires before all responses are received, as determined in step 414, then in step 426, the action dispatcher 70 declares the pre-plan timed-out.

In step 428, the action dispatcher 70 sends a results message 116 to the system that submitted the pre-plan, such as the restoration pre-plan system 108. The results message will indicate whether the pre-plan completed or timed-out. The process ends with step 430.

Figure 13:
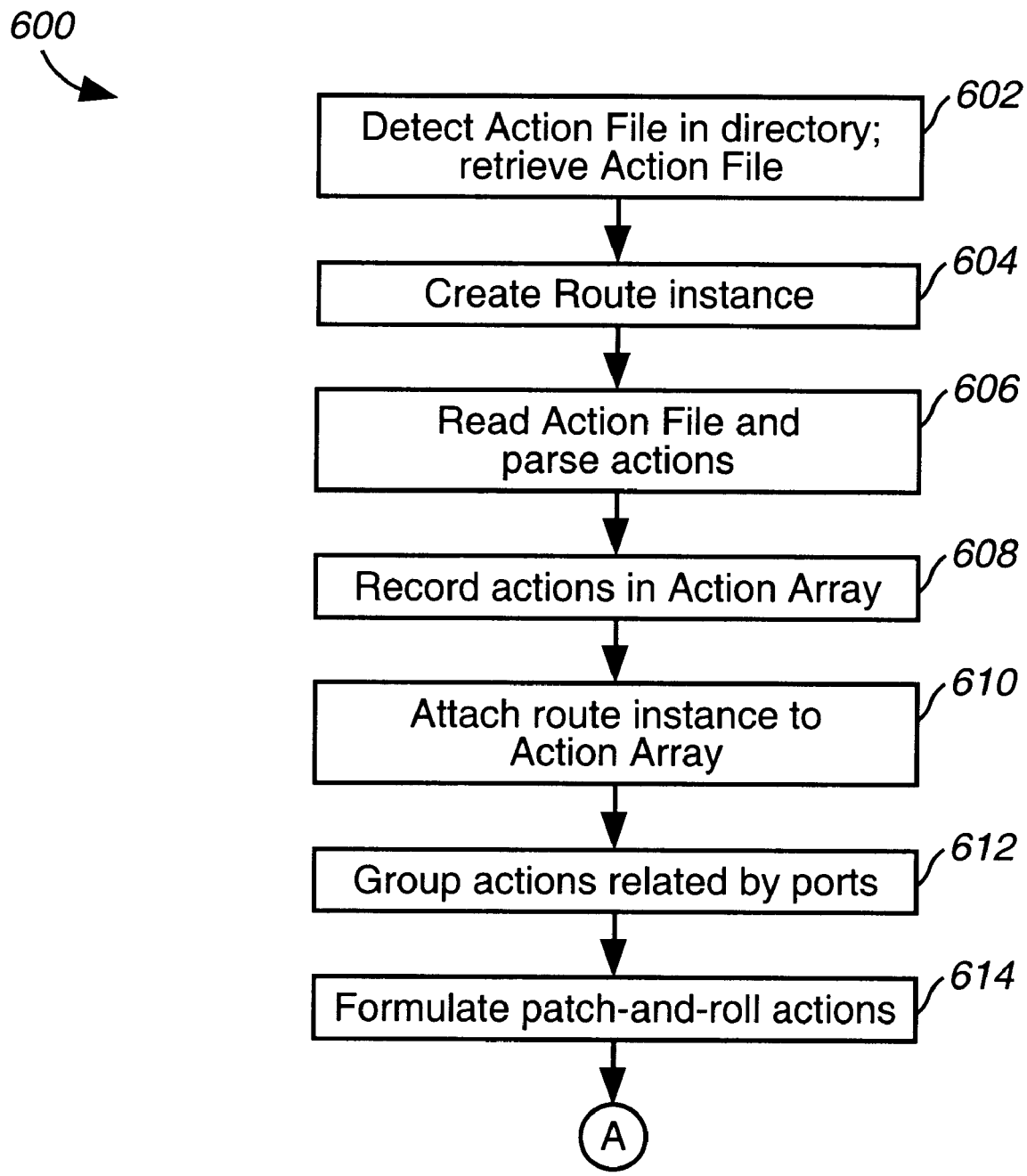
Figure 14:
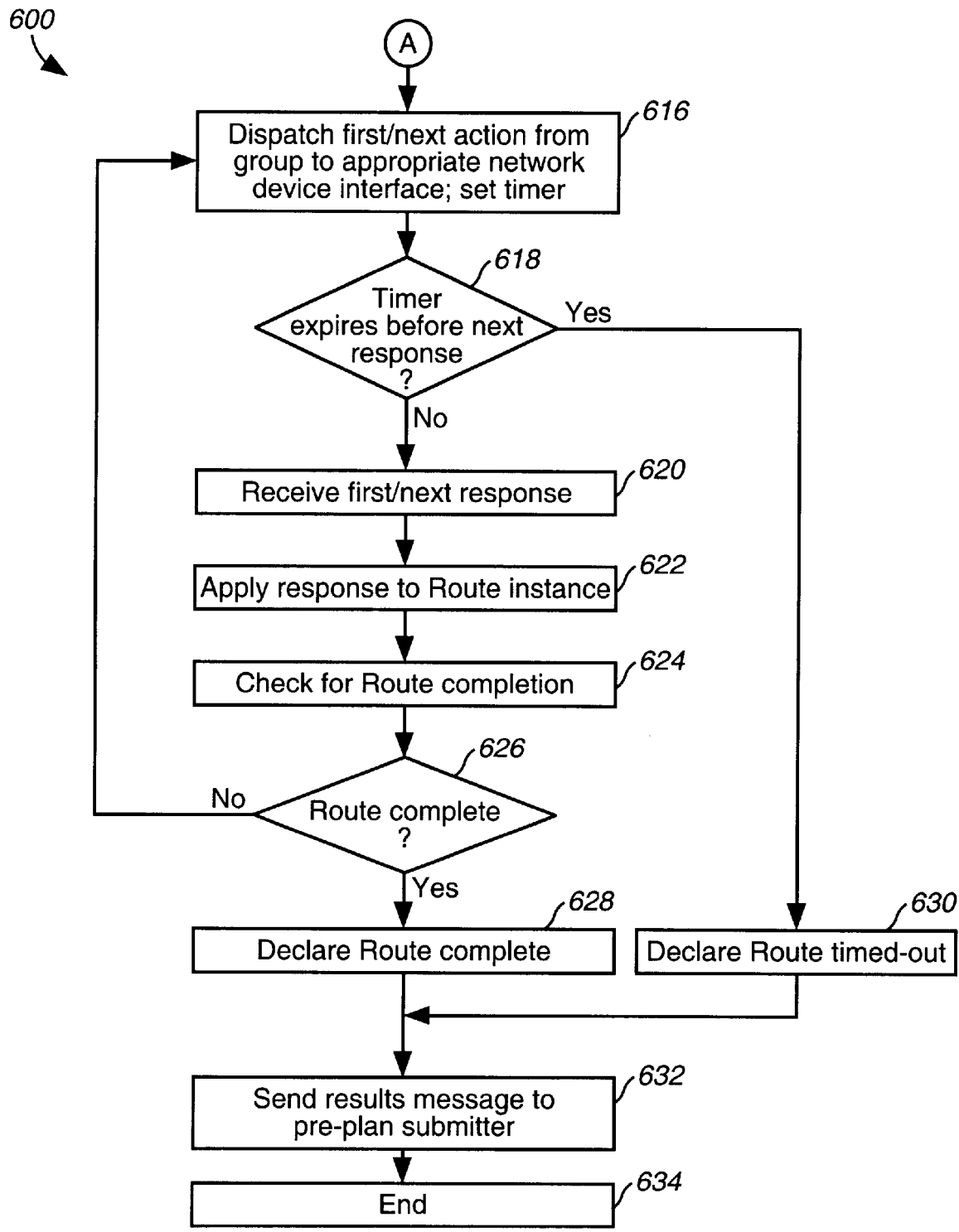

The normalization process 400 involves tearing down the restoration routes and restoring the original traffic routes. The action dispatcher 70 performs process 400 to normalize a network 14 after either dynamic restoration or pre-plan restoration. It should be noted that process 400 to normalize a network 14 is intrusive; the process 400 may cause an interruption to live traffic when switching from a restoration route to an original traffic route. A non-intrusive process for normalization is shown in FIGS. 13 and 14. To create an action file 78 for normalization after pre-plan restoration, the actions 110 for pre-plan restoration are simply inversed (connects become disconnects and disconnects become connects) and reversed. For example, if the following actions were part of a restoration pre-plan:

Device A: disconnect port 1 port 2
Device A: disconnect port 3 port 4
Device A: connect port 1 port 3
Device B: disconnect port 5 port 6
Device B: connect port 5 port 7 then an action file 78 for normalization would contain:

Device B: disconnect port 5 port 7
Device B: connect port 5 port 6
Device A: disconnect port 1 port 3
Device A: connect port 3 port 4
Device A: connect port 1 port 2

This action inversion, a reversal process is generally performed prior to the action dispatcher 70 for pre-plan normalization. The action 110 inversion may be performed by the restoration pre-plan system 17. To create an action file 78 for normalization after dynamic restoration, the action dispatcher 70 performs the same action inversion and reversal process.

FIGS. 13 and 14 are flowcharts illustrating the process performed by the action dispatcher 70 to normalize a network 14 in a non-intrusive manner and is denoted generally as 600. The process 600 shown in FIGS. 13 and 14 performs normalization in a manner that will not interrupt live traffic. Process 600 performs a connect/disconnect procedure known as patch-and-roll. This procedure will be described with reference to FIGS. 15–18.

Steps 602 through 610 are performed analogous to steps 402 through 410 in FIG. 11. When the action dispatcher 70 receives an action file 78 in step 602 or in step 402, the actions 110 in the action file 78 will be the same, regardless of whether standard normalization or patch-and-roll is to be performed. The action file 78 header will specify which is to be performed. The action dispatcher 70 reads the header and performs the appropriate process accordingly.

If the action dispatcher 70 is to perform standard normalization, the action dispatcher 70 dispatches the actions 110 as stated in the action file 78 (step 412). However, if the action dispatcher 70 is to perform patch-and-roll normalization, the action dispatcher 70 must perform a different process beginning with step 612.

In step 612, the action dispatcher 70 groups actions 110 that are related by a common port string. Actions 110 cannot be sent out as a single group, because for patch-and-roll, some actions 110 must be sent only after other actions 110 have been completed.

To group actions 110 related by a common port string, any action 110 that specifies a port that is common to another action 110 is grouped with that other action 110. In addition, any action 110 that specifies a port that is also specified by any action 110 in a group, is included in that group. Since ports are specific to a DXC 12, all actions 110 in a group will be for a single DXC 12.

For example, the following actions:

1. Device A: disconnect port 1 port 2
2. Device A: disconnect port 3 port 4
3. Device A: connect port 1 port 3
4. Device A: disconnect port 5 port 6
5. Device A: disconnect port 7 port 8
6. Device A: connect port 5 port 7 would be grouped into two groups as follows:

Group 1
  Device A: disconnect port 1 port 2
  Device A: disconnect port 3 port 4
  Device A: connect port 1 port 3
Group 2
  Device A: disconnect port 5 port 6
  Device A: disconnect port 7 port 8
  Device A: connect port 5 port 7

Even though action 1 and action 2 do not share any ports, they are grouped because they each share a port with action 3. The same holds true for action 4 and action 5. This is what is meant by a common port string.

In step 614, the action dispatcher 70 formulates the actions 110 needed to perform a patch-and-roll. This consists of adding additional actions 110 to those stated in the action file 78, and sequencing the actions 110. An example of how this is done is shown in FIG. 15 and in FIGS. 16 and 17.

Figure 15:
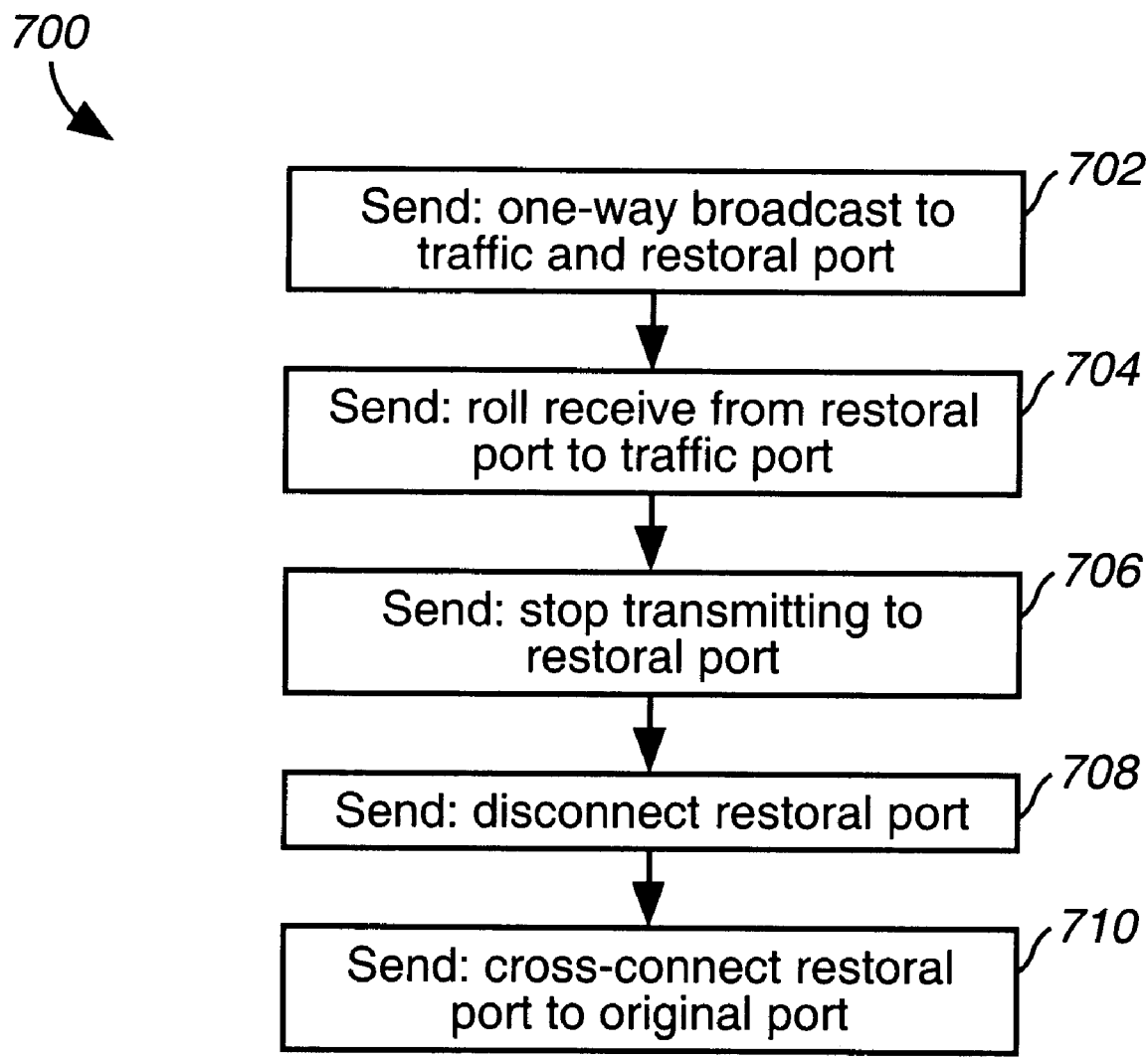

FIG. 15 illustrates the general sequence of actions 110 to perform a patch-and-roll and is denoted generally as 700. FIGS. 16 and 17 illustrate how these actions 110 are performed by two DXCs 12.

Figure 16A:
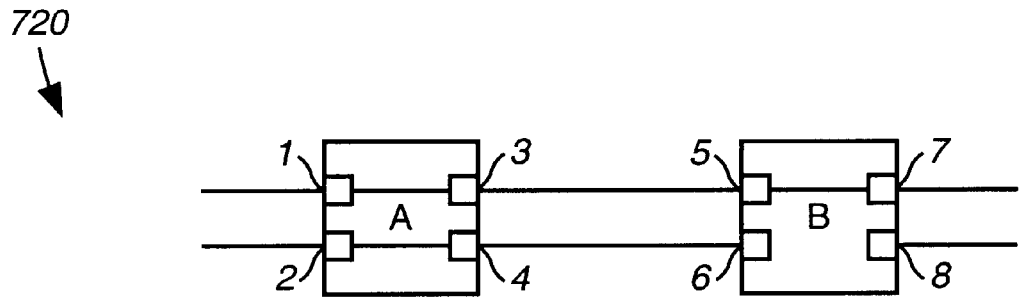
FIGS. 16–17 are schematic diagrams of switching elements.

In FIG. 16a, two DXCs 12 are shown and denoted generally as 720. DXC 12 A is shown with port 1 cross-connected to port 3, and port 2 cross-connected to port 4. DXC 12 B is shown with port 5 cross-connected to port 7, and port 6 and port 8 not cross-connected. A segment of an original traffic route traverses A1, A3, B5 and B7. This will be referred to as the traffic route.

The segment that traverses A2, A4 and B6 represents spare capacity. In particular, the segment connecting A4 to B6 is a designated spare segment that can be used for restoration.

Figure 16B:
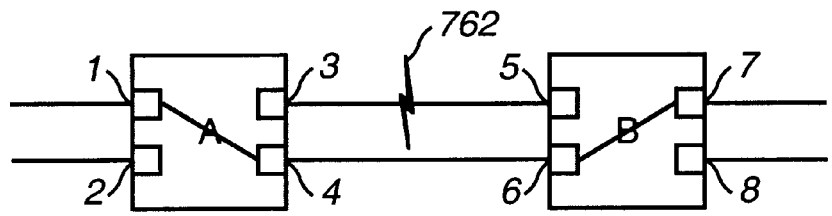

In FIG. 16b, a restoration route that was implemented in response to an outage 762 is shown. The outage 762 occurred between A3 and B5. To restore traffic, a restoration route was implemented that traverses A1, A4, B6 and B7. The objective of the patch-and-roll normalization process is to switch live traffic from the restoration route to the traffic route without interrupting live traffic.

The actions 110 received by the action dispatcher 70 in step 602 to perform standard normalization may be as follows:

Device A: disconnect port 1 port 4
Device A: connect port 1 port 3
Device B: disconnect port 6 port 7
Device B: connect port 5 port 7

In step 612, the action dispatcher 70 groups these actions 110 into two groups as follows:

Group 1
  Device A: disconnect port 1 port 4
  Device A: connect port 1 port 3
Group 2
  Device B: disconnect port 6 port 7
  Device B: connect port 5 port 7

In step 614, the action dispatcher 70 formulates actions 110, shown generically in FIG. 15, to perform non-intrusive patch-and-roll.

Figure 16C:
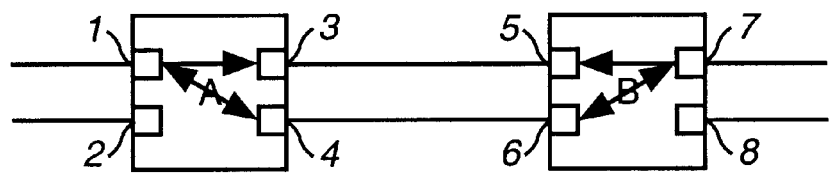

In step 702, action dispatcher 70 sends to each DXC 12 a command to perform a one-way broadcast to the restoration and traffic ports. A one-way broadcast enables a DXC 12 to transmit a signal from one port to more than one cross-connected ports. This is shown in FIG. 16c. DXC 12 A port 1 performs a one-way broadcast to both port 3 (traffic port) and port 4 (restoration port). Likewise, DXC 12 B port 7 performs a one-way broadcast to both port 5 (traffic port) and port 6 (restoration port). At this time, DXC 12 A port 1 is only receiving signal from port 4 and DXC 12 B port 7 in only receiving signal from port 6.

Figure 16D:
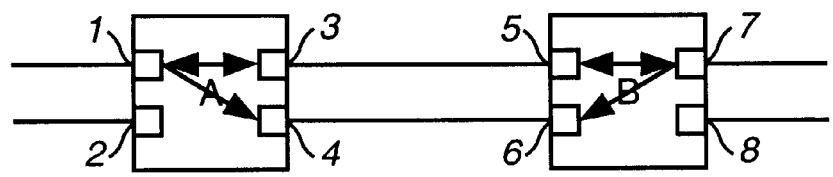

In step 704, action dispatcher 70 sends to each DXC 12 a command to roll the receive function from the restoration port to the traffic port. This is shown in FIG. 16d. DXC 12 A port 1, while still transmitting to both port 3 and port 4, will begin receiving only from port 3 (the traffic port). Likewise, DXC 12 B port 7, while still transmitting to both port 5 and port 6, will begin receiving only from port 5 (the traffic port).

Figure 17A:
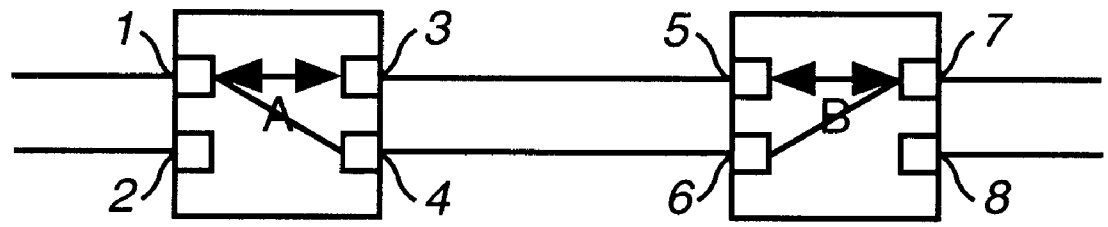

In step 706, the action dispatcher 70 sends to each DXC 12 a command to stop transmitting to the restoration port. This is shown in FIG. 17a. DXC 12 A port 1 stops transmitting to port 4, and DXC 12 B port 7 stops transmitting to port 6. At this time, both DXCs 12 are transmitting and receiving only over the traffic route.

Figure 17B:
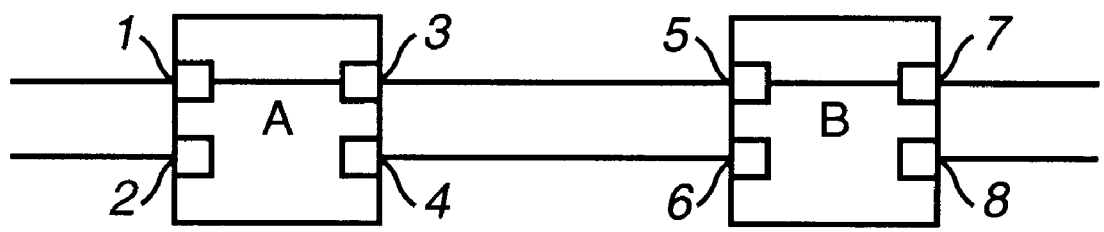

In step 708, the action dispatcher 70 sends to each DXC 12 a command to disconnect the restoration port. This is shown in FIG. 17b. DXC 12A disconnects port 1 and port 4, and DXC 12B disconnects port 7 and port 6.

Figure 17C:
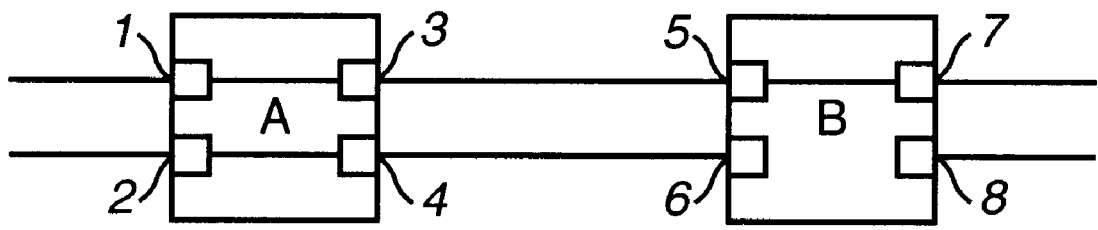

In step 710, the action dispatcher 70 sends to DXC 12A a command to restore the original spare segment. This is performed if there was a cross-connect for spare capacity, as shown in FIG. 16a DXC 12A port 2 and port 4. As shown in FIG. 17c, DXC 12A cross-connects port 2 to port 4 to restore this connection.

Returning now to FIGS. 13 and 14, after formulating patch-and-roll actions in step 614, the action dispatcher 70 dispatches these actions 110 in step 616. The action dispatcher 70 sends out one action 110 from each group simultaneously, but must wait for a successful response from all the first action 110 before sending the next action 110 in any group. As before, it also sets a timer to determine if the route times out. This timer is not reset with each response received, and thus only times out an entire route.

Step 618 determines if the timer expires before the next response 118 is received. If not, the action dispatcher 70 receives the next response 118 in step 620. The action dispatcher 70 applies the response to the route instance in the action array in step 622, and then checks for route completion in step 624. If the route is not complete, the process returns to step 616, where the action dispatcher 70 sends out the next action 110 in each group.

Steps 616 through 626 continue this way until the action dispatcher 70 determines the route is complete (step 626). At that time, the action dispatcher 70 declares the route complete in step 628, and sends a results message to the pre-plan submitter in step 632.

If the timer expires before all actions 110 are received, then in step 630, the action dispatcher 70 declares the route timed-out. The action dispatcher 70 sends a results message 116 indicating such to the pre-plan submitter is step 632. The process ends with step 634.

Figure 18:
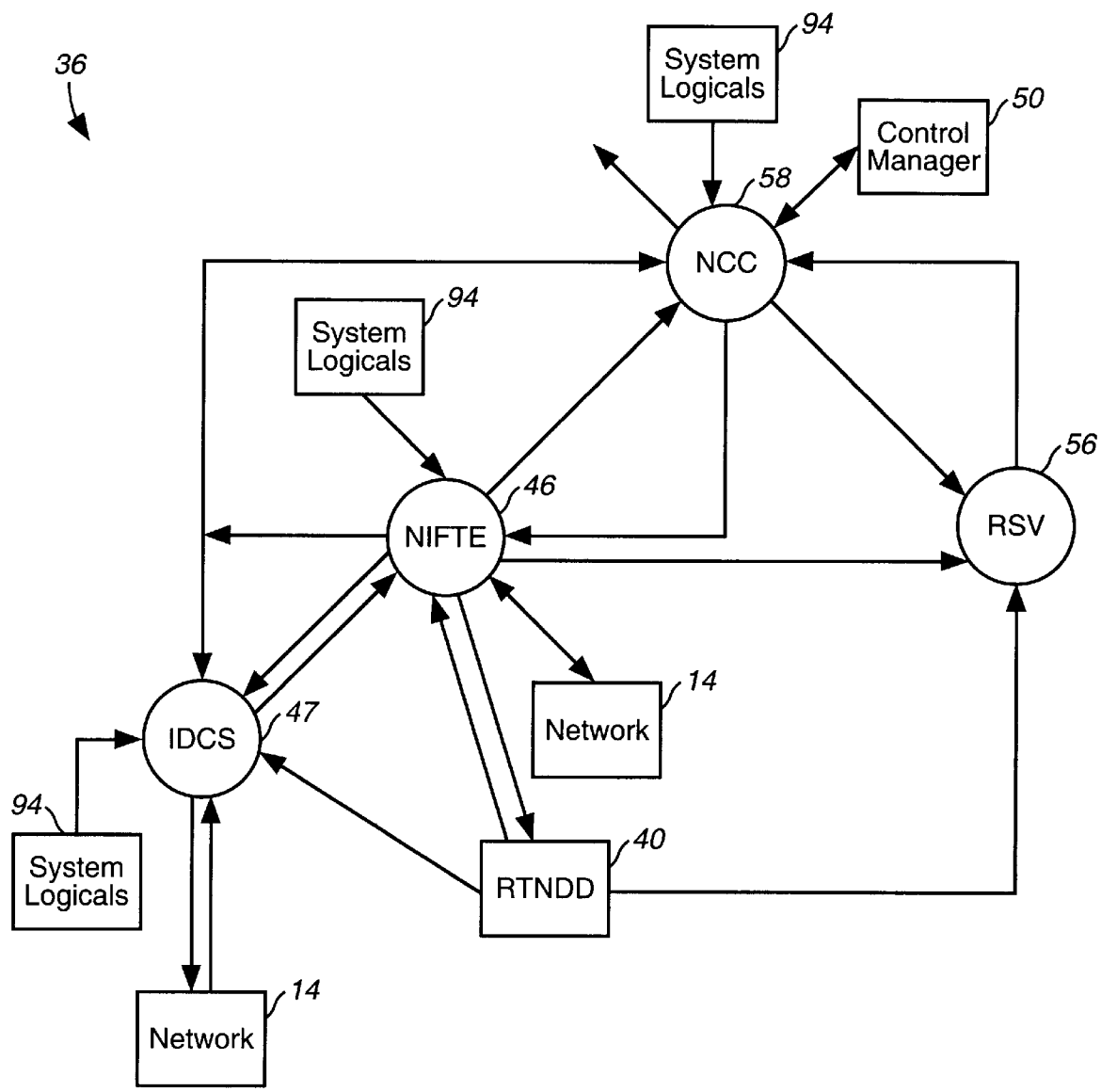
FIG. 18 is a block diagram of a network control component of a network restoration system of the present invention.

FIG. 18 illustrates in detail the logical architecture of network control 36. Network control 36 consists of four primary components, a NCC 58, NIFTE 46, a RSV 56, and an IDCS 47.

The NCC 58 serves as the main interface to and control for network control 36. NCC 58 is responsible for initiating the processing of the other components. In particular, NCC 58 initiates a distinct instance of a NIFTE 46 for each DXC 12 connection. NCC 58 also determines the current readiness mode of the RTR 10, and acts accordingly. When the RTR 10 readiness mode changes from "ready" to "alert", the NCC 58 sends messages to the other components to terminate automatic device audits and topology data updates.

The NCC 58 distributes messages to individual NIFTE 46. However, for the sake of quick performance in the event of an outage, the action dispatcher 70 can send messages directly to the mailboxes of individual NIFTE 46 processes.

The NIFTEs 46 are the interface to the DXCs 12. There is a distinct NIFTE 46 that runs for each DXC 12 that is controlled by RTR 10. NIFTE 46 take action commands from the action dispatcher 70 that are in a generic, internal format. The use of a generic internal format shields the other components of RTR 10 from having to know the specific type of DXC 12 that it at each site. The NIFTE 46 queries the RTNDD 40 with a generic specification of a DXC 12. The RTNDD 40 returns with the specific format to the command needed, which depends on the type of DXC 12 in place. It also returns with the network address of the DXC 12.

The NIFTE 46 can also receive action commands from external control systems 16. These commands are received by the control manager 50, and the control manager 50 sends them either directly to the specific NIFTEs 46, or to the NCC 58. The NIFTEs 46 also manage the communications links with the DXCs 12. These include dual redundant binary data links to each DXC 12 via the network 14, as well as communications over a backup communications network 26.

The IDCS 47 provides the communications interface with the Backup Communications network 26.

The RSV 56 component performs an auxiliary function of the RTR 10. It solicits alarms from spare trunk segments in the network 14. When alarms are received, RSV 56 can determine how these trunks are connected. An alarm is generated by a port, and specifies whether that port is internally cross-connected to another port on the same device. Additionally, by comparing alarms from different ports on different devices, RSV 56 can determine if a port on one device is connected to a port on another device, to determine inter-connectivity.

RSV 56 then compares the topology it has determined from alarms with the topology that is reflected in the RTNDD 40. If the derived topology data for a spare is inconsistent with what is reflected in RTNDD 40, RSV 56 will mark the spare as unavailable for restoral routes. This prevents the route generator 68 from attempting to use the spare in a restoral route, which would most likely result in a failed route implementation since the actual connectivity of that spare is different from what the route generator 68 would assume.

Network control 36 uses a partial list of key messages and are described here in detail. For example, a change execution state command may be sent to the NCC 58. The NCC 58 in turn distributes the message to the other components. When change readiness mode command sent to the NCC 58, the NCC 58 distributes the message to the other components. The control manager 50 initiates or terminates, an individual NIFTE 46 process for a single DXC 12 by sending a message to NCC 58. A NCC force audit command may be sent to the NCC 58 by the control manager 50. The NCC 58 passes the message, translated as a NIFTE 46 force audit command, to the NIFTE 46. This command may be provided by an external control system 16, and instructs network control 36 to initiate an audit of one or more DXCs 12. This audit is performed by the NIFTE 46. A NIFTE alarm registration command may be sent to the NIFTE 46 by any number of systems, including external systems via the control manager 50 instructing the NIFTE 46 to send unsolicited DXC 12 alarms to the specified client. The break isolator 66 is a primary such client. A NIFTE port connect command and NIFTE port disconnect command are issued by the action dispatcher 70 to individual NIFTEs 46. They specify port connect and disconnect actions in a generic format. The NIFTE 46 queries the RTNDD 40 to translate these commands to a format that is specific to the DXC 12 that particular NIFTE 46 supports.

A NIFTE 46 data update command is issued to the NIFTE 46 from any number of systems, including internal RTR 10 components, and requests a specific data update to be made to the RTNDD 40, to be performed by the NIFTE 46. A NIFTE data request command is issued to the NIFTE 46 from any number of systems, including internal RTR 10 components, and requests a specific data read from the RTNDD 40, to be performed by the NIFTE 46. A IDCS gateway command is issued by the NIFTE 46 to the IDCS 47 to send a command to a DXC 12 using the backup communications network 26. A binary device command is a command issued to a DXC 12 by the NIFTE 46, using the DXC's 12 binary data links accessed by network 14.

A binary device data command is a message sent by a DXC 12 to a NIFTE 46 over the network 14, and includes either a response to a command, a response to an audit, or an unsolicited alarm.

An IDCS message command is issued to a DXC 12 by the NIFTE 46, using the backup communications network 26 via the IDCS 47. An IDCS response is a message sent by a DXC 12 to a NIFTE 46 over the backup communications network 26, and includes either a response to a command, a response to an audit, or an unsolicited alarm.

Figure 19:
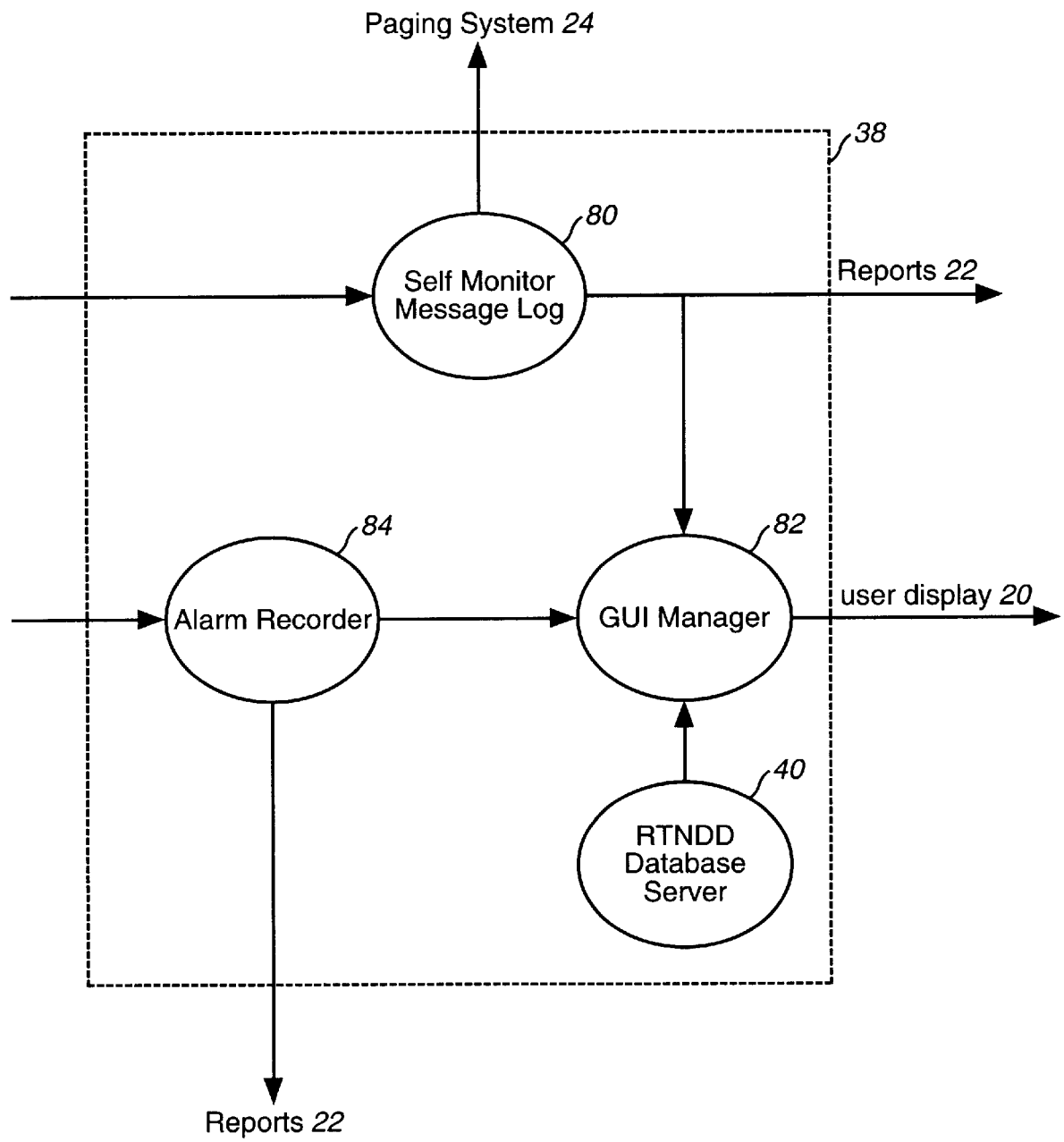
FIG. 19 is a block diagram of a reporting component of a network restoration system of the present invention.

FIG. 19 illustrates the logical architecture of the reporting 38 component. Reporting 38 consists of a self monitor message log 80, which receives error and status messages from each of the other RTR 10 components. These messages are stored in a log file. They can be made available for hard copy and soft copy reports 22. They can also be provided to a GUI manager 82 for output to a user display 20. These messages can also be match to certain thresholds and message type detectors. If a message of a certain type, or messages that exceed a certain threshold, are detected, a notification to a paging system 24 can be made so as to page the appropriate support personnel.

Reporting 38 also consists of an alarm recorder 84. All alarms received by RTR 10 via network control 36 are recorded in an internal list by the alarm recorder 84. This list can be provided to various reports 22, and to a user display 20 via a GUI manager 82. The GUI manager 82 formats and drives output to a user display 20. The GUI manager 82 can be used to output formatted data from the RTNDD 40. A database server process is incorporated into reporting 38 to provide the GUI manager 82 with RTNDD 40 data.

Therefore, the system and method disclosed herein have inherent advantages over the prior art. While certain embodiments of the invention have been illustrated for the purposes of this disclosure, numerous changes in the arrangement and construction of the parts may be made by those skilled in the art, such changes being embodied within the scope and spirit of the present invention as defined by the appended claims.

What is claimed is:

1. A system for dispatching commands to switching elements within a network in response to an outage comprising:

a control computer; and a plurality of instructions resident on a memory device coupled to a real-time database to receive real-time network topology information for operating said control computer, said plurality of instructions including a code segment response to said real-time network topology information for receiving and organizing connect and disconnect commands for said switching elements, a code segment responsive to said receiving and organizing connect and disconnect commands for grouping said connect and disconnect commands for each of said switching elements, a code segment response to said grouping code segment for sending connect and disconnect commands to said switching elements, a code segment responsive to receive analyzing responses from said switching elements to determine whether communications are restored, a code segment for normalizing said network if said code segment for analyzing responses from said switching elements determines communications are not restored and a code segment for normalizing said network after the cause of said outage is corrected.

2. The system as recited in claim 1 wherein said connect and disconnect commands for said switching elements are dynamically generated by said control computer in response to said real-time network topology information.

3. The system as recited in claim 1 wherein said connect and disconnect commands for said switching elements are received from a pre-plan database.

4. The system as recited in claim 1 wherein said code segment for normalizing said network further includes normalizing said network without disrupting communications within said network.

* * * * *